United States Patent
Kato et al.

(10) Patent No.: US 11,768,650 B2
(45) Date of Patent: Sep. 26, 2023

(54) DISPLAY CONTROL DEVICE, DISPLAY SYSTEM, AND DISPLAY CONTROL METHOD FOR CONTROLLING DISPLAY OF INFORMATION

(71) Applicant: Panasonic Intellectual Property Management Co., Ltd., Osaka (JP)

(72) Inventors: Masataka Kato, Kanagawa (JP); Koichi Emura, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 83 days.

(21) Appl. No.: 17/438,048

(22) PCT Filed: Mar. 11, 2020

(86) PCT No.: PCT/JP2020/010437
§ 371 (c)(1),
(2) Date: Sep. 10, 2021

(87) PCT Pub. No.: WO2020/184599
PCT Pub. Date: Sep. 17, 2020

(65) Prior Publication Data
US 2022/0147301 A1     May 12, 2022

(30) Foreign Application Priority Data
Mar. 11, 2019   (JP) ................................ 2019-043926

(51) Int. Cl.
*G06F 3/14*    (2006.01)
*B60K 35/00*   (2006.01)

(52) U.S. Cl.
CPC ............ *G06F 3/1423* (2013.01); *B60K 35/00* (2013.01); *B60K 2370/1529* (2019.05); *B60K 2370/166* (2019.05)

(58) Field of Classification Search
CPC ............ B60K 35/00; B60K 2370/1529; B60K 2370/166; B60K 2370/168;
(Continued)

(56) References Cited

U.S. PATENT DOCUMENTS

| 11,276,378 | B2 * | 3/2022 | Mizuno ................. | G02B 27/01 |
| 2005/0154505 | A1 * | 7/2005 | Nakamura ............. | G02B 27/01 |
| | | | | 701/1 |

(Continued)

FOREIGN PATENT DOCUMENTS

| JP | 2002-2418 A | 1/2002 |
| JP | 2005-59660 A | 3/2005 |

(Continued)

OTHER PUBLICATIONS

International Search Report, dated Jun. 9, 2020, for International Application No. PCT/JP2020/010437, 6 pages. (with English Translation).

*Primary Examiner* — Nelson M Rosario
(74) *Attorney, Agent, or Firm* — Seed IP Law Group LLP

(57) ABSTRACT

An input unit receives a signal relating to an object. A generation unit generates first information and second information relating to the object based on the signal received by the input unit. A control unit displays the first information that has been generated on a first display device and displays the second information that has been generated on a second display device. The control unit changes the display mode of the first information with the passage of time according to the first regularity and the display mode of the second information with the passage of time according to the second regularity corresponding to the first regularity.

25 Claims, 13 Drawing Sheets

(58) Field of Classification Search
CPC ...... B60K 2370/177; B60K 2370/1868; B60K 2370/1876; G01C 21/36; G06F 3/01; G06F 3/1423; G06F 3/147; G08G 1/0969; G08G 1/16; G09G 2380/10
See application file for complete search history.

(56) References Cited

U.S. PATENT DOCUMENTS

| | | |
|---|---|---|
| 2013/0176335 A1 | 7/2013 | Sugiyama et al. |
| 2016/0196098 A1* | 7/2016 | Roth ........................ G09G 5/00 715/761 |
| 2016/0297363 A1 | 10/2016 | Ishizuka et al. |

FOREIGN PATENT DOCUMENTS

| | | |
|---|---|---|
| JP | 2012-56335 A | 3/2012 |
| JP | 2015-42941 A | 3/2015 |
| JP | 2016-199133 A | 12/2016 |
| JP | 2017-71398 A | 4/2017 |

* cited by examiner

DISPLAY CONTROL DEVICE, DISPLAY SYSTEM, AND DISPLAY CONTROL METHOD FOR CONTROLLING DISPLAY OF INFORMATION

TECHNICAL FIELD

The present disclosure relates to a display control technology, and particularly to a display control device, a display system, a display control method, and a program for controlling the display of information.

BACKGROUND ART

When multiple display devices are used in conjunction with one another, even if information displayed on each display device is related to one another, it is difficult to understand the relevance. Further, in a situation where the user is looking at the information displayed on one display device, it is difficult for the user to notice any change in the information displayed on the other display device. In order to make it easier to understand the relevance of the information displayed on each display device, related figures are generated that indicate that the information is related, and the related figures are displayed on each display device (see, for example, Patent Literature 1).

PRIOR ART REFERENCE

Patent Literature

[Patent Literature 1] Japanese Unexamined Patent Application Publication No. 2015-42941

SUMMARY OF INVENTION

Technical Problem

In a display device for displaying detailed information, the user needs to understand the shape of the related figures, and the user therefore must pay attention to the display device. Therefore, the user needs to move his/her line of sight when grasping the position of the detailed information, and other actions are thus hindered.

In this background, a purpose of the present disclosure is to provide a technology for giving notification of the relevance of information displayed on a plurality of display devices while suppressing the movement of the line of sight.

Solution to Problem

To solve the problem above, a display control device according to one aspect of the present disclosure includes: an input unit that receives a signal relating to an object; a generation unit that generates first information and second information relating to the object based on the signal received by the input unit; and a control unit that displays the first information generated by the generation unit on a first display device and displays the second information generated by the generation unit on a second display device. The amount of information of the second information generated by the generation unit is equal to or less than the amount of information of the first information, and the control unit changes the display mode of the first information with the passage of time according to the first regularity and the display mode of the second information with the passage of time according to the second regularity corresponding to the first regularity.

Another aspect of the present disclosure relates to a display system. This display system includes a first display device, a second display device, and a display control device that controls display on the first display device and the second display device. The display control device includes: an input unit that receives a signal relating to an object; a generation unit that generates first information and second information relating to the object based on the signal received by the input unit; and a control unit that displays the first information generated by the generation unit on a first display device and displays the second information generated by the generation unit on a second display device. The amount of information of the second information generated by the generation unit is equal to or less than the amount of information of the first information, and the control unit changes the display mode of the first information with the passage of time according to the first regularity and the display mode of the second information with the passage of time according to the second regularity corresponding to the first regularity.

Still another aspect of the present disclosure relates to a display control method. This method includes: receiving a signal relating to an object; generating first information and second information relating to the object based on the received signal; and displaying the first information that has been generated on a first display device and displaying the second information that has been generated on a second display device. The amount of information of the second information generated in the generating is equal to or less than the amount of information of the first information, and in the displaying, the display mode of the first information is changed with the passage of time according to the first regularity and the display mode of the second information is changed with the passage of time according to the second regularity corresponding to the first regularity.

Optional combinations of the aforementioned constituent elements, or implementations of the present disclosure in the form of devices, systems, methods, programs, recording mediums storing programs, and vehicles on which the device is mounted may also be practiced as additional modes of the present disclosure.

Advantageous Effects of Invention

According to the present disclosure, notification of the relevance of information displayed on a plurality of display devices can be given while suppressing the movement of the line of sight.

DESCRIPTION OF EMBODIMENTS

First Embodiment

A brief description of the present disclosure will be given before a specific description thereof is given. The present embodiment relates to a display system that is mounted on a vehicle. The display system includes a plurality of display devices and a display control device that controls the display of the display devices. One of the plurality of display devices is, for example, a head-up display (HUD). By displaying information on the windshield of a vehicle, a HUD displays the information at a position closer to the line-of-sight direction during driving compared to, e.g., a monitor of a car navigation device installed in the vehicle. Therefore, the driver who is driving can immediately notice the display or see the display with a small amount of movement of the line of sight. However, since the front view is shielded by the display of the information by the HUD, the information cannot be displayed in a large size, and it is not recommended to display a large amount of information.

Therefore, one possible option is a display method in which only simple information such as an icon is displayed on the HUD and detailed information is displayed on the monitor. In such display, it is difficult to understand how the icon and the detailed information are related, and it is difficult for the driver to understand which detailed information corresponds to the icon. Therefore, as described previously, it is required to give notification of the relevance of information displayed on the plurality of display devices while suppressing the movement of the line of sight.

In the present embodiment, when displaying information related to each of a plurality of display devices, the display modes of these pieces of information are matched over a certain period of time. Matching the display modes means, for example, displaying the pieces of information using synchronous blinking or as a synchronized animation. More specifically, the HUD displays an icon indicating the existence of an object, and the monitor displays detailed information about the object. Further, the icon and the detailed display are blinked in synchronization, or the sizes of the icon and the detailed display are changed in synchronization. With such display control, it is possible to give notification that the icon and the detailed display are related while suppressing the movement of the line of sight. Hereinafter, embodiments of the present disclosure will be described in detail with reference to the drawings. It should be noted that each of the embodiments described below is an example, and the present disclosure is not limited to these embodiments.

Figure 1:
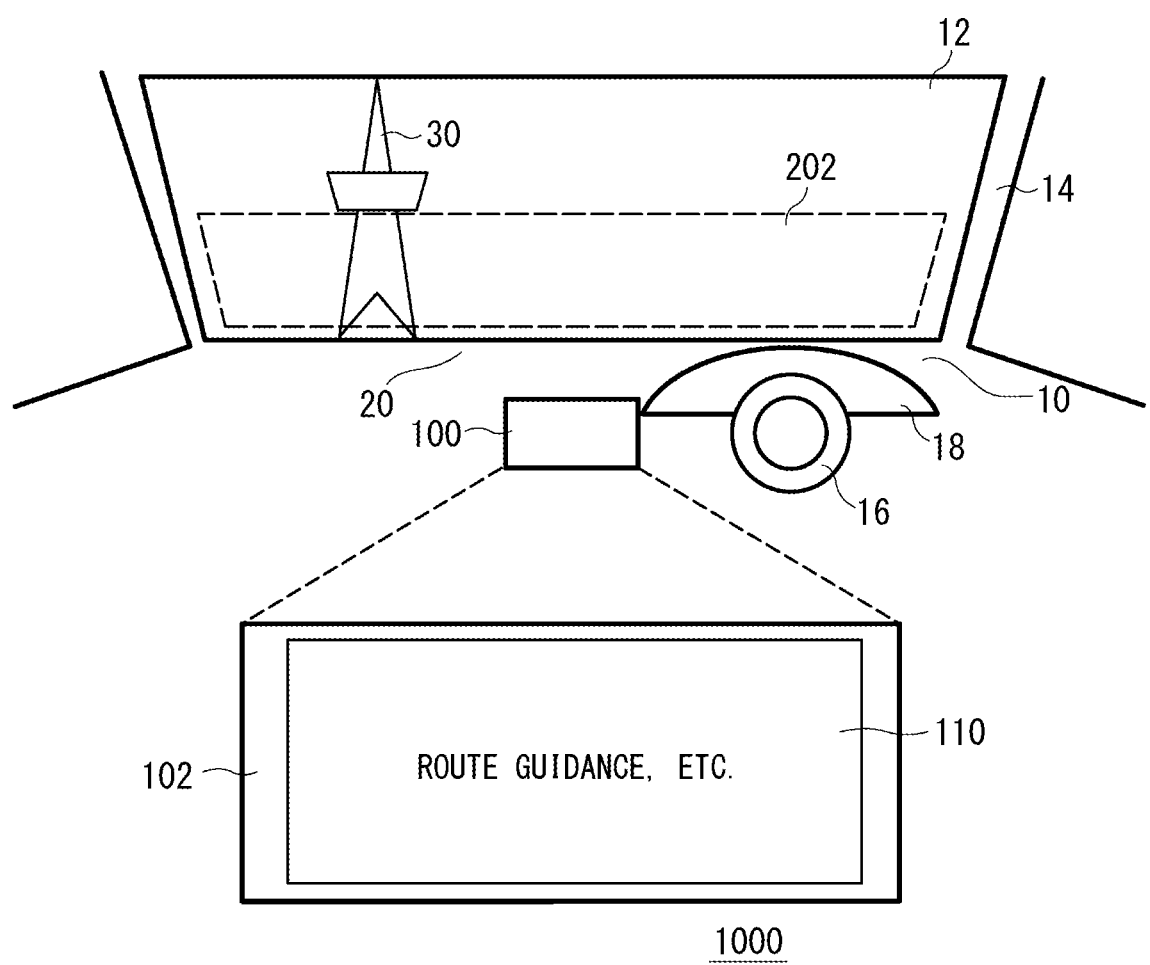
FIG. 1 is a diagram schematically showing the interior of a vehicle according to the first embodiment.

FIG. 1 schematically shows the interior of a vehicle 1000 and shows the configuration of the interior of the vehicle 1000 is viewed from the rear side. A dashboard 10 extending to the left and right is arranged in the front side of the vehicle interior, a windshield 12 is arranged above the dashboard 10, and pillars 14 extend from the dashboard 10 to the left and right of the windshield 12. An object 30 is arranged outside the vehicle 1000, and the driver can visually recognize the object 30 through the windshield 12. The object 30 is an object for which information should be provided to the driver, and is, for example, a building, a tourist spot, or the like.

A steering wheel 16 is arranged on the right side of the dashboard 10, and a meter 18 is arranged on the dashboard 10 in front of the steering wheel 16. The steering wheel 16 may be located on the left side part of the dashboard 10. A center console 20 is arranged in the central part of the dashboard 10, and a first display device 100 is installed in the center console 20. The first display device 100 is, for example, a monitor of a navigation device. Guidance information 110 is displayed in a first display area 102 of the first display device 100. The guidance information 110 is, for example, route guidance, music information, and radio information.

Further, a second display device (not shown) is installed in the dashboard 10 on the steering wheel 16 side. The second display device is a HUD and projects display light onto a part of a second display area 202 of the windshield 12. The display light reflected on the vehicle interior side in the second display area 202 is visually recognized by the driver. The driver can visually recognize a virtual image of an image projected by the second display device by superimposing the virtual image on the foreground of the dashboard 10. The second display area 202 is arranged in front of the driver's seat on the windshield 12 and has a horizontally long rectangular shape. The display on the second display area 202 by the second display device is not performed. The case where such a display is made will be described below.

Figure 2:
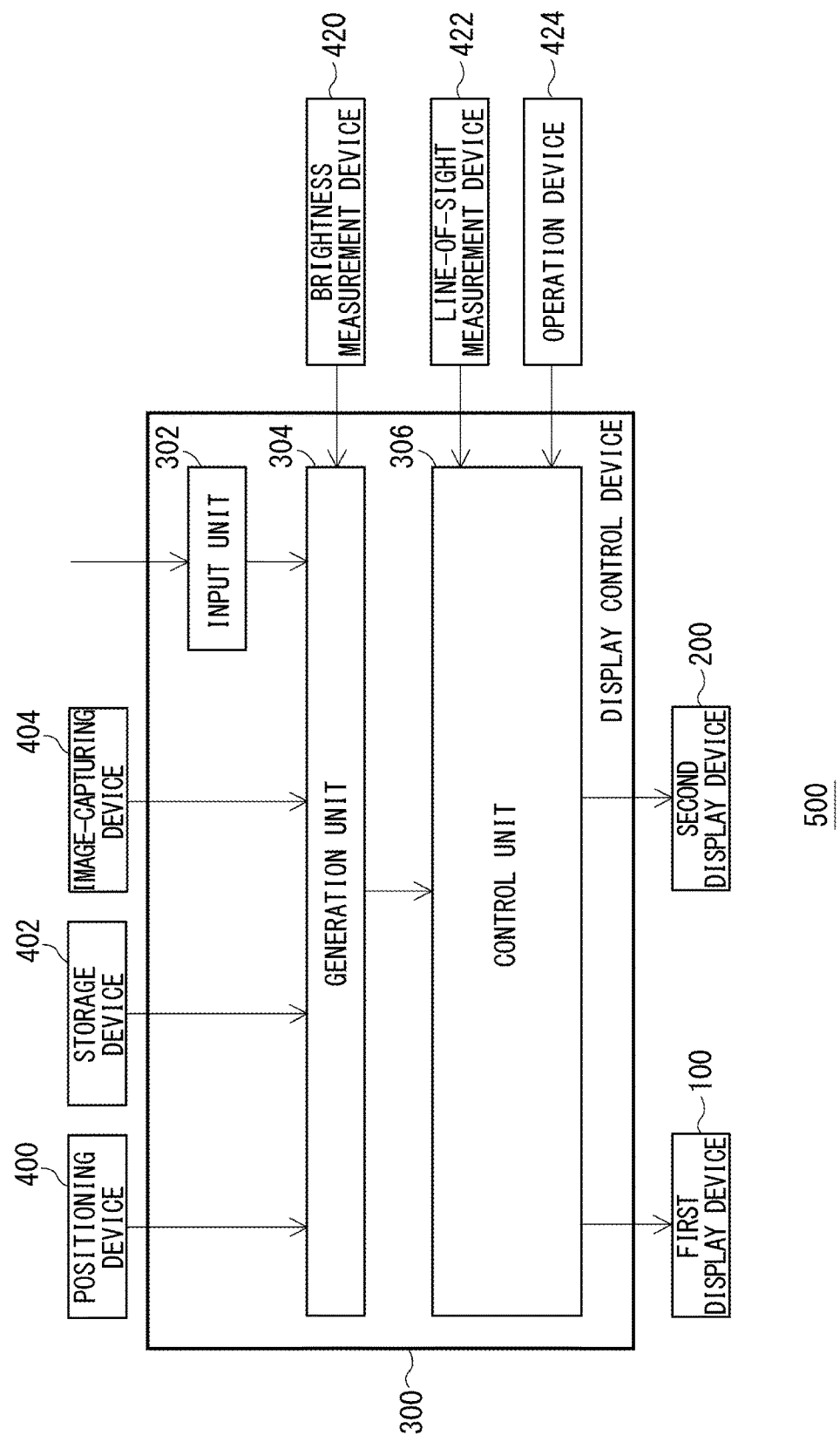
FIG. 2 is a diagram showing the configuration of a display system according to the first embodiment.

FIG. 2 shows the configuration of a display system 500. The display system 500 includes a first display device 100, a second display device 200, and a display control device 300. The display control device 300 includes an input unit 302, a generation unit 304, and a control unit 306. A positioning device 400, a storage device 402, an image-capturing device 404, a brightness measurement device 420, a line-of-sight measurement device 422, and an operation device 424 are connected to the display control device 300 by, for example, an in-vehicle network such as control area network (CAN).

The first display device 100 is the monitor of the navigation device or the meter 18 shown in FIG. 1. The second display device 200 is a HUD. However, the first display device 100 or the second display device 200 is not limited to these devices. The second display device 200 only needs to have a second display area 202 located inside the field of view of the driver who is driving, and the first display device 100 only needs to have a first display area 102 located outside the field of view of the driver who is driving. Also, the first display device 100 and the second display device 200 may be set such that the resolution of the first display area 102 in the first display device 100 is larger than the resolution of the second display area 202 in the second display device 200. Further, a third display device or the like (not shown) may be connected to the display control device 300. In this way, the first display device 100 and the second display device 200 are mounted on the vehicle 1000 and are arranged on the front side of the driver's seat in the vehicle 1000. Further, the first display device 100 and the second display device 200 may be devices for displaying information on the side glass.

The positioning device 400 receives a signal from a Global Navigation Satellite System (GLASS) satellite, and measures position information, azimuth information, and the like of the vehicle 1000 based on the received signal. The position information is indicated by latitude and longitude. The azimuth information is indicated by an azimuth angle, with north as the reference azimuth (0 degree) and a clockwise angle as a positive angle. The positioning device 400 transmits the position information, the azimuth information, and the like that have been measured to the display control device 300.

The storage device 402 stores map information that can be associated with the position information, the azimuth information, and the like measured by the positioning device 400. An example of the map information is a three-dimensional map (3D map). The map information also includes position information, shape information, and the like of the object 30 in FIG. 1. The image-capturing device 404 is installed, for example, in the front side part of the vehicle 1000 and images the scenery in front of the vehicle 1000. This corresponds to scenery in front of the vehicle 1000 that is visible to the driver through the windshield 12. The image-capturing device 404 transmits a captured video image to the display control device 300.

The generation unit 304 of the display control device 300 receives the position information, the azimuth information, and the like from the positioning device 400 and the video image from the storage device 402. The generation unit 304 identifies an object 30 included in the map information by referring to the map information stored in the storage device 402 based on the position information, the azimuth information, and the like. Further, the generation unit 304 identifies an object 30 included in the video image by executing a pattern matching process on the video image. Further, the generation unit 304 identifies an object 30 that is visible to the driver through the windshield 12 by combining the object 30 included in the map information and the object 30 included in the video image. The generation unit 304 may identify the object 30 that is visible to the driver through the windshield 12 based on the position information, the azimuth information, and the like or on the video image. At that time, the generation unit 304 identifies the position and direction (hereinafter, referred to as "visible position") from the driver when the driver visually recognizes the object 30 through the windshield 12.

The input unit 302 receives a signal related to the object 30 identified by the generation unit 304 (hereinafter, referred to as "object signal"). The object signal is received from a server via wireless communication or received from the storage device 402. Before receiving the object signal, the display control device 300 may request the server or the storage device 402 to output the object signal. The object signal received by the input unit 302 includes information on the urgency of the object 30 (hereinafter referred to as "urgency information") and information such as the name and description of the object 30. The urgency information indicates any one of warning, caution, and information.

The warning represents information that exhibits a degree of urgency in a temporal manner or is highly urgent. The caution is information that indicates that although there is no urgency in time, it is dangerous if left unattended. The information is information that is nice to have but that does not cause a problem for the vehicle to travel without. An example of the information is tourist site information. Therefore, the degree of urgency is in the following order: warning>caution>information. The degree of urgency for each object 30 is given in advance. The input unit 302 outputs the received object signal to the generation unit 304.

The generation unit 304 receives the object signal from the input unit 302 and extracts urgency information from the object signal. When the urgency information indicates "information", the generation unit 304 determines to execute display that is synchronized (hereinafter, referred to as "synchronous display") between the first display device 100 and the second display device 200. Whether or not the generation unit 304 executes the synchronous display when the urgency information indicates warning or caution may be set in advance. By executing filtering based on the urgency information in this way, highly-frequent synchronous display can be suppressed, reducing annoyance.

When the execution of the synchronous display is determined, the generation unit 304 generates information to be displayed in the first display area 102 of the first display device 100 (hereinafter, referred to as "first information") and information to be displayed in the second display area 202 of the second display device 200 (hereinafter, referred to as "second information") based on the object signal. Both the first information and the second information are information regarding the object 30. The first information is text information showing an explanation of the object 30. This text information corresponds to the above-mentioned detailed information. On the other hand, the second information represents an icon for notifying the driver that the object 30 exists, for example, "there is a tourist spot" and "there is a gas station". This icon is displayed at a visible position in the second display area 202 by the control unit 306 described later. The size of the second information 220 is smaller than the size of the second display area 202, and the second information 220 has a smaller amount of information than the first information 120. Since the amount of information of the second information 220 may be the same as the amount of information of the first information 120, it can be considered that the amount of information of the second information 220 is equal to or less than the amount of information of the first information 120. The generation unit 304 outputs the first information 120, the second information 220, the information regarding the visible position, and the information as to whether or not to execute the synchronous display to the control unit 306.

Figure 3:
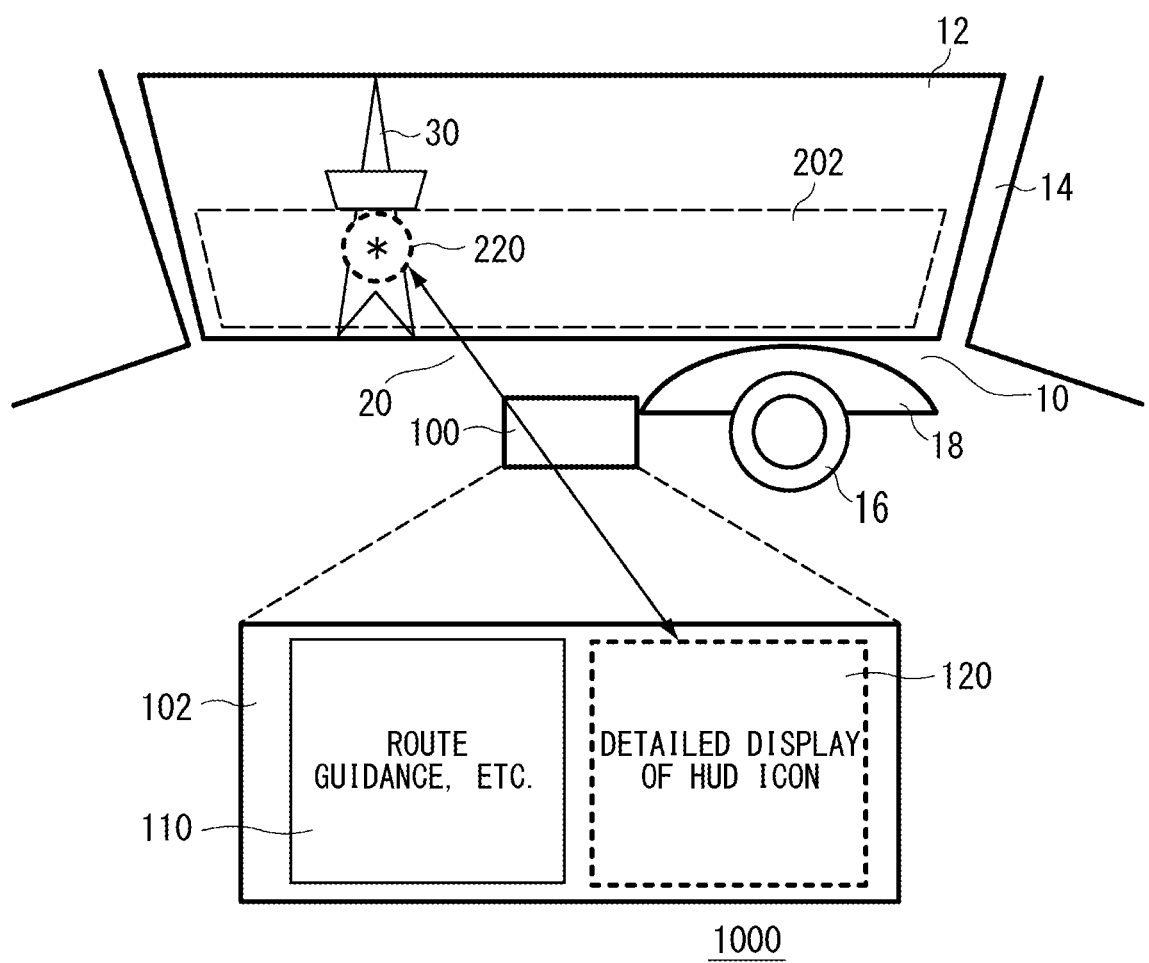
FIG. 3 is another diagram schematically showing the interior of the vehicle according to the first embodiment.

The control unit 306 displays the first information 120 generated by the generation unit 304 on the first display device 100, and displays the second information 220 generated by the generation unit 304 on the second display device 200. At that time, the control unit 306 displays the second information 220 at the visible position in the second display area 202 based on the information regarding the visible position. Further, the control unit 306 executes the synchronous display when the information as to whether or not to execute the synchronous display indicates the execution of the synchronous display. FIG. 3 is used to explain the display by the control unit 306.

FIG. 3 is another diagram schematically showing the interior of the vehicle 1000. FIG. 3 is shown in the same way as in FIG. 1. The first display area 102 of the first display device 100 is divided into two, one of which displays the guidance information 110 as in FIG. 1 and the other displays the first information 120. Further, the second information 220 is displayed at the visible position of the second display area 202. By displaying the second information 220 at the visible position, the second information 220 is displayed so as to be superimposed on the object 30 when the driver sees the object 30 through the windshield 12. That is, the second information 220 is displayed by augmented reality (AR). When executing the synchronous display, the control unit 306 changes the display mode of the first information 120 with the passage of time according to the first regularity, and changes the display mode of the second information 220 with the passage of time according to the second regularity. Further, the point of time for the change in the first regularity and the point of time for the change in the second regularity are matched. When the first regularity is referred to as the first mode, the second regularity is referred to as the second mode.

Figure 4A:
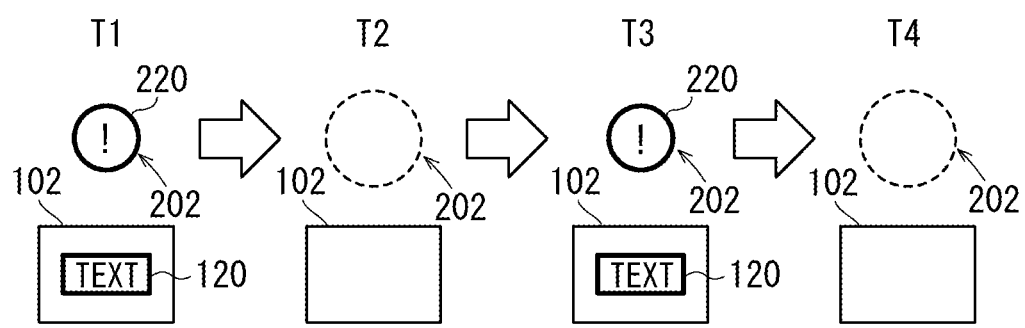
FIGS. 4A-4B are diagrams showing a general outline of synchronous display performed by a display control device in FIG. 2.
Figure 4B:
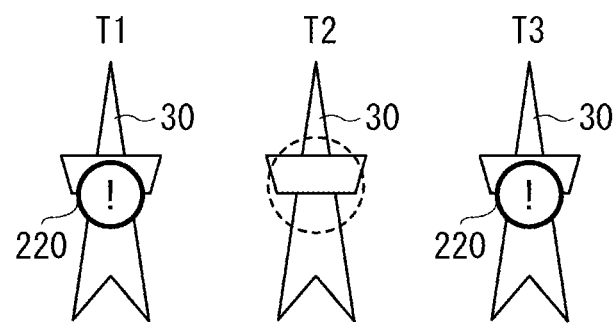

FIGS. 4A to 4B show a general outline of synchronous display performed by the display control device 300. FIG. 4A shows a case where the change in the first regularity is the blinking of the first information 120 and the change in the second regularity is the blinking of the second information 220. At a point of time T1, the first information 120 is displayed in the first display area 102, and the second information 220 is displayed in the second display area 202. At a point of time 12 following the point of time T1, the first information 120 is not displayed in the first display area 102, and the second information 220 is not displayed in the second display area 202. At a point of time T3 following the point of time 12, the first information 120 is displayed in the first display area 102, and the second information 220 is displayed in the second display area 202. At a point of time 14 following the point of time T3, the first information 120 is not displayed in the first display area 102, and the second information 220 is not displayed in the second display area 202. The point of time T1 returns after the point of time T4.

That is, the control unit 306 matches the point of time for blinking in the first regularity with the point of time for blinking in the second regularity. These blinks are performed, for example, at a frequency of 3 Hz or less. FIG. 4B shows the relationship between the second information 220 and the object 30 in FIG. 4A in more detail. The center of the second information 220 is superimposed on the object 30 indicated by the visible position. Therefore, when the object 30 moves due to the movement of the vehicle 1000, the second information 220 also moves. The point of time for blinking of the first information 120 in the first regularity and the point of time for blinking of the second information 220 in the second regularity do not have to match as long as the points of time are close enough for the blinking of the first information 120 and the blinking of the second information 220 to be found to correspond to each other. In other words, the chronological change of the blinking in the first regularity and the chronological change of the blinking in the second regularity need to match.

Figure 5:
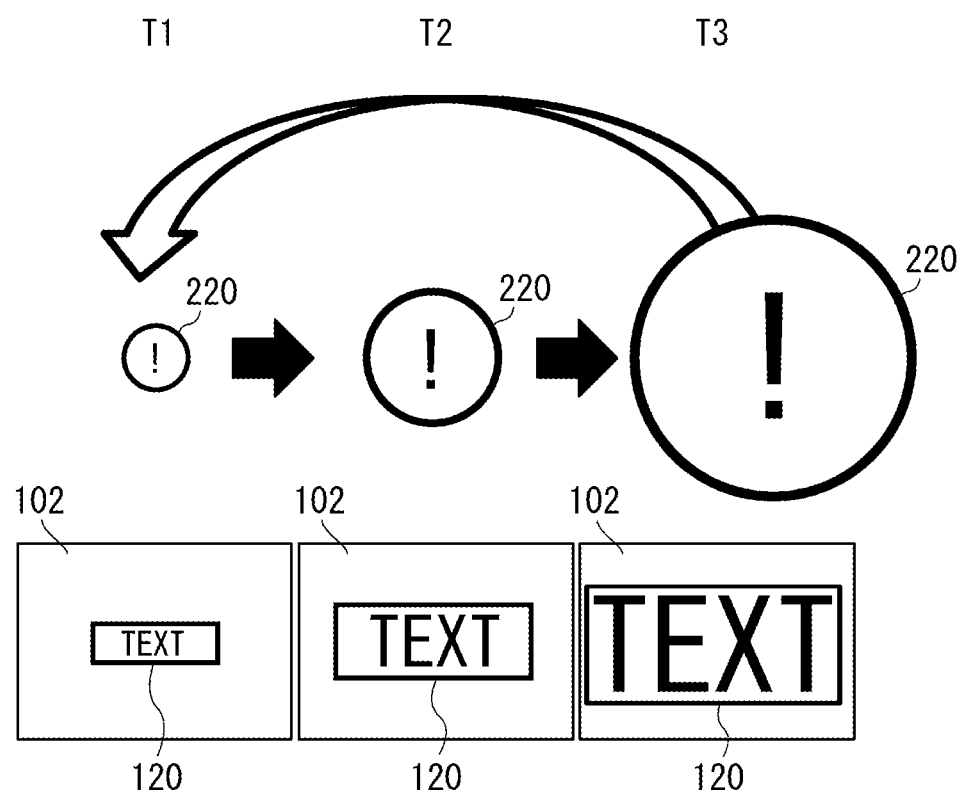
FIG. 5 is a diagram showing a general outline of another synchronous display performed by the display control device in FIG. 2.

FIG. 5 shows a general outline of another synchronous display performed by the display control device 300. This indicates a case where the change in the first regularity is the enlargement or reduction of the size of the first information 120 and the change in the second regularity is the enlargement or reduction of the size of the second information 220. Moving from the point of time T1 to the point of time T2, the first information 120 in the first display area 102 is enlarged, and the second information 220 in the second display area 202 is also enlarged. Moving from the point of time 12 to the point of time T3, the first information 120 in the first display area 102 is enlarged, and the second information 220 in the second display area 202 is also enlarged. Such a "small display gradually becomes enlarged" animation is an example of a synchronized animation. The point of time T1 returns after the point of time T3. Therefore, the first information 120 in the first display area 102 is reduced, and the second information 220 in the second display area 202 is also reduced. That is, the control unit 306 matches the point of time for the enlargement or reduction in the first regularity with the point of time for the enlargement or reduction in the second regularity. The point of time for the enlargement or reduction of the first information 120 in the first regularity and the point of time for the enlargement or reduction of the second information 220 in the second regularity do not have to match as long as the points of time are close enough for the enlargement or reduction of the first information 120 and the enlargement or reduction of the second information 220 to be found to correspond to each other. In other words, the chronological change of the enlargement or reduction in the first regularity and the chronological change of the enlargement or reduction in the second regularity need to match. That is, the first regularity and the second regularity only need to correspond to each other.

By showing a display as shown in FIGS. 4A to 4B or FIG. 5, the driver who is driving can recognize that the first information 120 is displayed in the first display area 102 when seeing the second information 220 displayed in the second display area 202 with the second regularity. Further, since the first information 120 is displayed in the first display area 102 in synchronization with the second information 220, the driver immediately recognizes the first information 120. Thereby, notification of the relevance between the first information 120 displayed on the first display device 100 and the second information 220 displayed on the second display device 200 is given while suppressing the movement of the driver's line of sight.

Blinking of the first information 120 and the second information 220 as shown in FIGS. 4A to 4B may cause photosensitive epilepsy if the difference in brightness is large. In order to suppress this, the brightness measurement device 420 shown in FIG. 2 measures the brightness of the ambient light around the vehicle 1000. Illuminance may be measured instead of the brightness. Publicly-known techniques may be used for the measurement, and the explanation thereof is thus omitted. The brightness measurement device 420 outputs information on the measured brightness to the generation unit 304. When the control unit 306 causes the first information 120 and the second information 220 to blink, the generation unit 304 adjusts the brightness of the first information 120 and the brightness of the second information 220 based on the information on the brightness from the brightness measurement device 420. For example, as the measured brightness becomes lower, the generation unit 304 lowers the brightness of the first information 120 and the brightness of the second information 220.

In the following, when to start the display according to the first regularity and the display according to the second regularity will be described. For example, the control unit 306 matches the point of time for starting the display of the first information 120 according to the first regularity with the point of time for starting the display of the second information 220 according to the second regularity. In this case, the control unit 306 displays the first information 120 and the second information 220 at the same time. Following this, the control unit 306 starts the display according to the first regularity and the display according to the second regularity at the same time. Alternatively, the control unit 306 may display the second information 220, then display the first information 120, and then start the display according to the first regularity and the display according to the second regularity at the same time.

The control unit 306 may set the point of time for starting the display of the first information 120 according to the first regularity and the point of time for starting the display of the second information 220 according to the second regularity to be off from each other. In this case, the control unit 306 displays the first information 120 and the second information 220 at the same time. Following this, the control unit 306 starts the display according to the second regularity and then starts the display according to the first regularity. Alternatively, after displaying the second information 220 and then displaying the first information 120, the control unit 306 may start the display according to the second regularity and then start the display according to the first regularity.

In other words, the control unit 306 sets the difference between a point of time when a change in the display mode of the first information 120 based on the first regularity starts and a point of time when a change in the display mode of the second information 220 based on the second regularity starts to be within a predetermined threshold value. Further, the control unit 306 sets either one of the cycle of the change based on the first regularity and the cycle of the change based on the second regularity to be a predetermined integer multiple of the other one of the cycle of the change based on the first regularity and the cycle of the change based on the second regularity. In this case, the control unit 306 may set the difference between the point of time when a change in the display mode of the first information 120 based on the first regularity starts and the point of time when a change in the display mode of the second information 220 based on the second regularity starts being displayed to be larger than the predetermined threshold value.

When the control unit 306 receives an object signal subsequent to an object signal already received or when the object 30 moves out of the second display area 202, the control unit 306 ends the display of the second information 220, thereby ending the synchronous display. In order to suppress the occurrence of annoyance caused due to the synchronous display, the control unit 306 may execute the next process. For example, the control unit 306 starts a timer after matching the point of time for the change in the first regularity with the point of time for the change in the second regularity, that is, after starting the synchronous display. This may be the matching of the chronological change in the first regularity with the chronological change in the second regularity. The control unit 306 ends the synchronous display by ending the matching of the point of time for the change in the first regularity with the point of time for the change in the second regularity when a certain period of time has elapsed on the timer. This may be the ending of the matching of the chronological change in the first regularity with the chronological change in the second regularity.

The control unit 306 may end the synchronous display using the measurement result of the line-of-sight measurement device 422. The line-of-sight measurement device 422 measures the driver's line of sight. For example, the line-of-sight measurement device 422 is an image capturing device installed in a vehicle, and measures the driver's line-of-sight by imaging the driver's face. The line-of-sight measurement device 422 outputs the measurement result to the control unit 306. The control unit 306 determines whether or not the line of sight is directed to the first information 120 by the pattern matching process. Further, when the line of sight is directed to the first information 120, the control unit 306 measures the duration thereof. After the start of the synchronous display, when a period of time for paying attention to the first information 120 has passed a certain period of time, the control unit 306 ends the synchronous display. As described, upon detecting the attention to the first information 120 paid by the user, the control unit 306 sets the difference between a point of time when the change in the display mode of the first information 120 based on the first regularity ends and a point of time when change in the display mode of the second information 220 based on the second regularity ends to be within a predetermined threshold value.

The control unit 306 may end the synchronous display using input received by the operation device 424. The operation device 424 is, for example, a button capable of receiving input from the driver. When the driver desires to end the synchronous display, he/she enters ending input to the operation device 424. The operation device 424 outputs the ending input to the control unit 306. After the start of the synchronous display, the control unit 306 ends the synchronous display upon receiving the ending input. As described, when the ending input is received, the control unit 306 sets the difference between a point of time when the change in the display mode of the first information 120 based on the first regularity ends and a point of time when change in the display mode of the second information 220 based on the second regularity ends to be within a predetermined threshold value.

In the following, when to end the display according to the first regularity and the display according to the second regularity will be described. For example, the control unit 306 matches the point of time for ending the display of the first information 120 according to the first regularity with the point of time for ending the display of the second information 220 according to the second regularity. In this case, the control unit 306 ends the display according to the first regularity and the display according to the second regularity at the same time. Following this, the control unit 306 ends the display of the first information 120 and the display of the second information 220 at the same time. Alternatively, after ending the display according to the first regularity and the display according to the second regularity at the same time, the control unit 306 may end the display of the second information 220 and then end the display of the first information 120.

The control unit 306 may set the point of time for ending the display of the first information 120 according to the first regularity and the point of time for ending the display of the second information 220 according to the second regularity to be off from each other. In this case, the control unit 306 ends the display according to the second regularity and then ends the display according to the first regularity. The control unit 306 ends the display of the first information 120 and the display of the second information 220 at the same time. Alternatively, after ending the display according to the second regularity and then ending the display according to the first regularity, the control unit 306 may end the display of the second information 220 and then end the display of the first information 120.

As described above, the control unit 306 sets the difference between a point of time when the change in the display mode of the first information 120 based on the first regularity ends and a point of time when the change in the display mode of the second information based on the second regularity ends to be within a predetermined threshold value. Further, the control unit 306 sets either one of the cycle of the change based on the first regularity and the cycle of the change based on the second regularity to be a predetermined integer multiple of the other one of the cycle of the change based on the first regularity and the cycle of the change based on the second regularity. In this case, the control unit 306 may set the difference between the point of time when the change based on the first regularity in the display mode of the first information ends and the point of time when the change based on the second regularity in the display mode of the second information ends to be larger than the predetermined threshold value.

Figure 6:
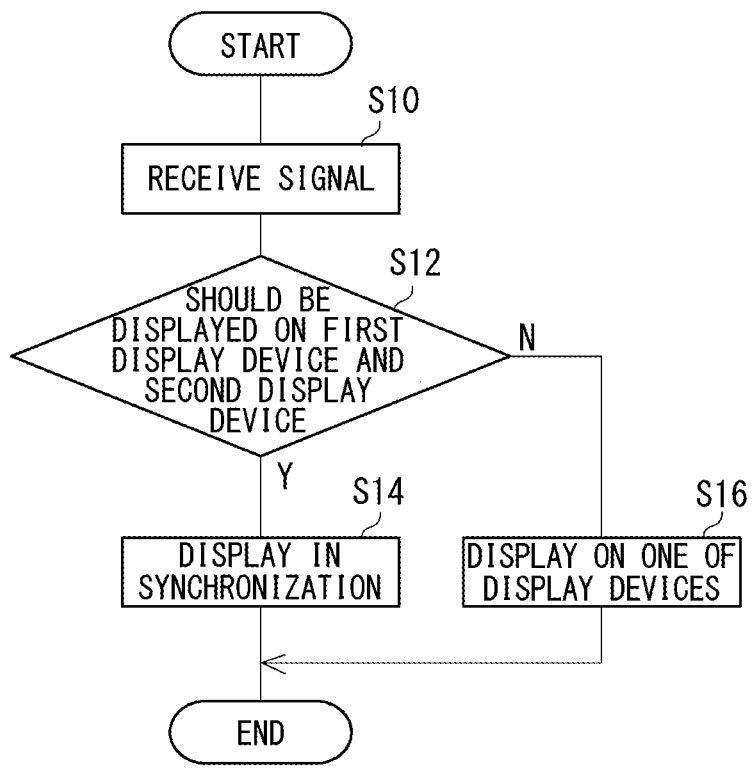
FIG. 6 is a flowchart showing a procedure of display control performed by the display control device in FIG. 2.

The operation of the vehicle 1000 having the above-mentioned structure will now be described. FIG. 6 is a flowchart showing a procedure of display control performed by the display control device 300. The input unit 302 receives an object signal (S10). When display should be performed by both the first display device 100 and the second display device 200 (Y in S12), the control unit 306 causes the first information 120 and the second information 220 to be displayed in synchronization (S14). When display should not be performed by both the first display device 100 and the second display device 200 (N in S12), the control unit 306 causes one of the first display device 100 and the second display device 200 to display information (S16).

Figure 7C:
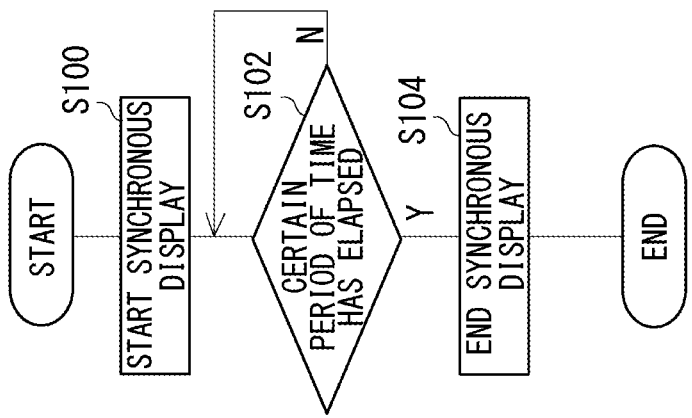
FIGS. 7A-7C are flowcharts showing a procedure of ending the synchronous display performed by the display control device in FIG. 2.
Figure 7B:
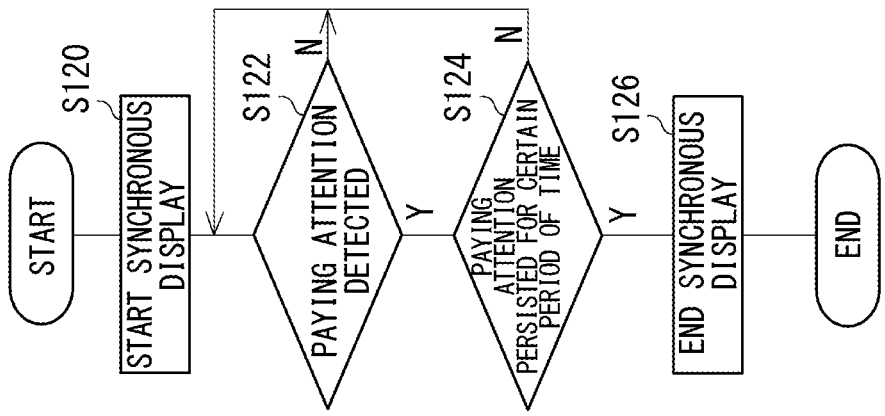
Figure 7A:
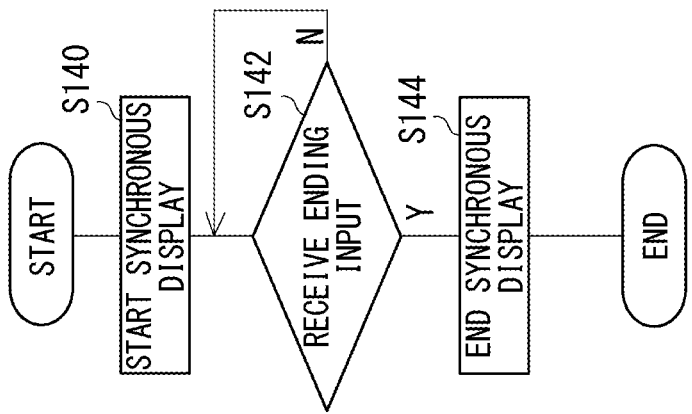

FIGS. 7A to 7C are flowcharts showing a procedure of ending the synchronous display performed by the display control device 300. In FIG. 7A, the control unit 306 starts the synchronous display (S100). If a certain period of time has not elapsed (N in S102), the control unit 306 continues the synchronous display and goes back to the step 102. When a certain period of time has elapsed (Y in S102), the control unit 306 ends the synchronous display (S104).

In FIG. 7B, the control unit 306 starts the synchronous display (S120). If no paying attention is detected (N in S122), the control unit 306 continues the synchronous display and goes back to the step 122. Upon detecting paying attention (Y in S122), the control unit 306 continues the synchronous display and goes back to the step 122 if the paying attention has not persisted for a certain period of time (N in S124). When the paying attention has persisted for the certain period of time (Y in S124), the control unit 306 ends the synchronous display (S126).

In FIG. 7C, the control unit 306 starts the synchronous display (S140). When no ending input is not received (N in S142), the control unit 306 continues the synchronous display and goes back to the step 142. When the ending input is received (Y in S142), the control unit 306 ends the synchronous display (S144).

According to the present embodiment, since the point of time for the change in the first regularity of the first information 120 and the point of time for the change in the second regularity of the second information 220 are matched, notification of the relevance between the first information 120 and the second information 220 can be given while suppressing the movement of the line of sight. Further, since the point of time for the change in the first regularity of the first information 120 and the point of time for the change in the second regularity of the second information 220 are matched, once the driver notices the second information 220, the driver can recognize the first information 120 while suppressing the movement of the line of sight. Further, since the notification of the relevance between the first information 120 and the second information 220 is given while suppressing the movement of the line of sight, central vision is not required for the perception of the relevance, and the influence on other work performed by the driver can thus be reduced. Further, since the relevance of the pieces of information is perceived without the movement of the line of sight, the relevance can be easily understood without disturbing the driving. Further, since whether or not the reading of detailed information can be performed and when to perform the reading can be adjusted after seeing an icon displayed on the HUD, annoyance in acquiring the information can be reduced.

Further, since the point of time for blinking in the first regularity and the point of time for blinking in the second regularity are matched, notification of the relevance between the first information 120 and the second information 220 can be given. Further, since the point of time for the enlargement or reduction in the first regularity and the point of time for the enlargement or reduction in the second regularity are matched, notification of the relevance between the first information 120 and the second information 220 can be given. Further, since the point of time for starting display in the first regularity and the point of time for starting display in the second regularity are matched, notification of the relevance between the first information 120 and the second information 220 can be given. Further, since the point of time for starting the display in the first regularity and the point of time for starting the display in the second regularity are set to be off from each other, it is possible to execute the display that matches the action of looking at one and then looking at the other.

Further, when the certain period of time has passed, the matching of the point of time for the change in the first regularity with the point of time for the change in the second regularity is ended, and the annoyance due to the synchronous display can therefore be suppressed from occurring. Further, upon detecting paying attention to the first information 120, the matching of the point of time for the change in the first regularity with the point of time for the change in the second regularity is ended, and the annoyance due to the synchronous display can therefore be suppressed from occurring. Further, upon receiving the ending input, the matching of the point of time for the change in the first regularity with the point of time for the change in the second regularity is ended, and the annoyance due to the synchronous display can therefore be suppressed from occurring. Also, since the first display device and the second display device are mounted on a vehicle, information for supporting driving can be displayed. Further, since the first display device and the second display device are arranged on the front side of the driver's seat in the vehicle, information for supporting driving can be displayed.

Second Embodiment

The second embodiment will be described next. The second embodiment relates to a display system 500 that synchronously displays the first information 120 in the first display device 100 and the second information 220 in the second display device 200 in the same way as in the first embodiment. In the first embodiment, it is assumed that there is one object 30. Meanwhile, in the second embodiment, it is assumed that there are two objects 30. A vehicle 1000 and a display system 500 according to the second embodiment are of the same type as those in FIGS. 1, 3, and 2. A description will be made mainly regarding the difference from the previous explanations.

In FIG. 2, the generation unit 304 of the display control device 300 thus far identifies an object 30 visible to the driver through the windshield 12. This object 30 corresponds to the "first object 30" in the second embodiment. Therefore, the generation unit 304 identifies the visible position for the first object 30 as "first visible position". Further, since an object signal received by the input unit 302 can be considered to be the first signal relating to the first object 30, the generation unit 304 generates the first information 120 and the second information 220 relating to the first object 30 based on the received first signal.

On the other hand, the generation unit 304 according to the second embodiment also identifies the second object 30 visible to the driver through the windshield 12. The second object 30 is different from the first object 30. The generation unit 304 identifies the visible position for the second object 30 as "second visible position". Further, the input unit 302 also receives a second signal, which is an object signal relating to the second object 30. The generation unit 304 generates the third information and the fourth information relating to the second object 30 based on the received second signal. The third information is information to be displayed in the first display area 102 of the first display device 100, and the fourth information is information to be displayed in the second display area 202 of the second display device 200. Since it is only necessary to generate the third information in the same manner as the first information and generate the fourth information in the same manner as the second information, the description thereof is thus omitted. The amount of information of the fourth information is smaller than that of the third information. Since the amount of information of the fourth information may be the same as the amount of information of the third information, it can be considered that the amount of information of the fourth information is equal to or less than the amount of information of the third information.

The control unit 306 displays the third information generated by the generation unit 304 on the first display device 100, and displays the fourth information generated by the generation unit 304 on the second display device 200. At that time, the control unit 306 displays the fourth information at the second visible position in the second display area 202 based on the information regarding the second visible position. Further, the control unit 306 executes the synchronous display when the information as to whether or not to execute the synchronous display indicates the execution of the synchronous display. When executing the synchronous display, the control unit 306 changes the display mode of the third information with the passage of time according to the third regularity, and changes the display mode of the fourth information with the passage of time according to the fourth regularity. Further, the point of time for the change in the third regularity and the point of time for the change in the fourth regularity are matched. When the third regularity is referred to as the third mode, the second regularity is referred to as the second mode.

The third regularity is similar to the first regularity, and the fourth regularity is similar to the second regularity. However, the point of time for the change in the first regularity and the point of time for the change in the third regularity are set to be off from each other, and the point of time for the change in the second regularity and the point of time for the change in the fourth regularity are set to be off from each other. For example, when the change in each of the first regularity through the fourth regularity is blinking, the point of time for displaying the first information 120 and the second information 220 and the point of time for displaying the third information and the fourth information are reversed.

Figure 8A:
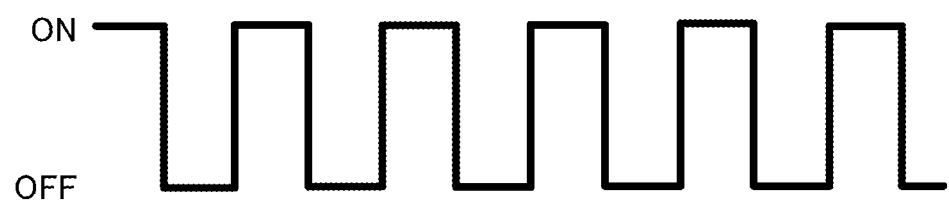
FIGS. 8A-8B are diagrams showing a general outline of synchronous display according to the second embodiment.
Figure 8B:
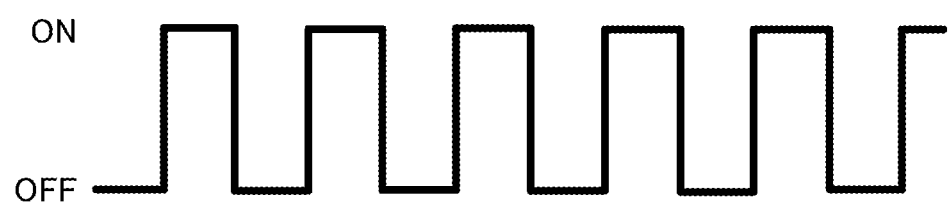

FIGS. 8A to 8B are diagrams showing a general outline of synchronous display. FIG. 8A shows control over the first information 120 and the second information 220. ON indicates the point of time at which the first information 120 and the second information 220 are displayed and corresponds to the point of time T1 and the point of time T3 in FIG. 4A. On the other hand, OFF indicates the point of time at which the first information 120 and the second information 220 are not being displayed and corresponds to the point of time T2 and the point of time T4 in FIG. 4A. FIG. 8B shows control over the third information and the fourth information. As shown in the figure, FIG. 8B shows a phase inversion with respect to FIG. 8A. Therefore, when the first information 120 and the second information 220 are displayed, the third information and the fourth information are not displayed, and when the first information 120 and the second information 220 are not displayed, the third information and the fourth information are displayed. FIG. 2 is referred back. Further, the frequency of the blinking in the first regularity and the second regularity may be different from the frequency of the blinking in the third regularity and the fourth regularity. Further, the duty ratio of the blinking in the first regularity and the second regularity may be different from the duty ratio of the blinking in the third regularity and the fourth regularity.

On the other hand, when the change in each of the first regularity through the fourth regularity is a synchronized animation, the point of time for displaying the first information 120 and the second information 220 in the maximum size and the point of time for displaying the third information and the fourth information in the maximum size can be changed. Further, the frequency at which the first information 120 and the second information 220 change may be different from the frequency at which the third information and the fourth information change. That is, the third regularity and the fourth regularity correspond to each other, the first regularity and the third regularity do not correspond to each other, and the second regularity and the fourth regularity do not correspond to each other.

According to the present embodiment, the point of time for the change in the first regularity and the point of time for the change in the third regularity are set to be off from each other, and the point of time for the change in the second regularity and the point of time for the change in the fourth regularity are set to be off from each other. Therefore, the display of the first object 30 and the display of the second object 30 can be distinguished from each other. Further, since the display of the first object 30 and the display of the second object 30 are distinguished from each other, respective pieces of information regarding the two objects 30 can be displayed at the same time.

Third Embodiment

Subsequently, the third exemplary embodiment will be described. The third embodiment relates to a display system 500 similar to those shown thus far. Thus far, synchronous display is performed on the first information 120 in the first display device 100 and the second information 220 in the second display device 200. On the other hand, in the third embodiment, the first information 120 is not displayed on the first display device 100, and the second information 220 is displayed on the second display device 200. A vehicle 1000 and a display system 500 according to the third embodiment are of the same type as those in FIGS. 1, 3, and 2. A description will be made mainly regarding the difference from the previous explanations.

The generation unit 304 of the display control device 300 in FIG. 2 receives a video image from the storage device 402. The generation unit 304 identifies a pedestrian included in the video image by executing a pattern matching process on the video image. At that time, the generation unit 304 also identifies the visible position with respect to the pedestrian. The input unit 302 receives a signal related to the pedestrian identified by the generation unit 304 (hereinafter, this is also referred to as "object signal"). Urgency information in the object signal indicates warning or caution.

The generation unit 304 receives the object signal from the input unit 302 and extracts the urgency information from the object signal. When the urgency information indicates warning or caution, the generation unit 304 determines not to execute the synchronous display. This corresponds to displaying only the second information 220 without displaying the first information 120. When it is determined not to execute the synchronous display, the generation unit 304 generates only the second information 220 without generating the first information 120 based on the object signal. The generation unit 304 outputs the first information 120, the information regarding the visible position, and the information as to whether or not to execute the synchronous display to the control unit 306.

Figure 9:
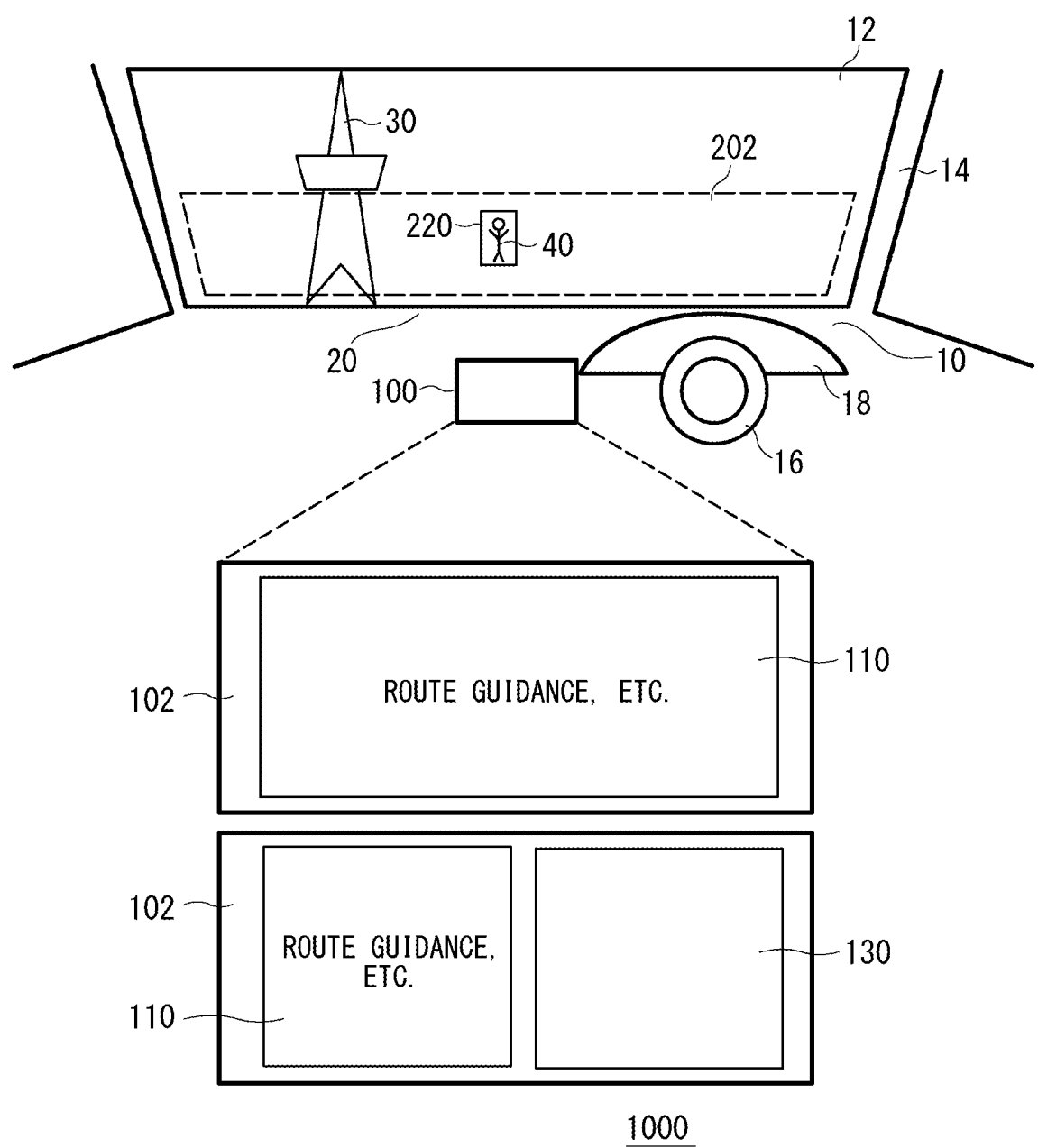
FIG. 9 is a diagram schematically showing the interior of a vehicle according to the third embodiment.

The control unit 306 displays the second information 220 generated by the generation unit 304 on the second display device 200. At that time, the control unit 306 displays the second information 220 at the visible position in the second display area 202 based on the information regarding the visible position. FIG. 9 is a diagram schematically showing the interior of the vehicle 1000. This is shown in the same way as in FIG. 1. There is a pedestrian 40 outside the vehicle 1000. Further, the second information 220 is displayed so as to surround the pedestrian 40 in the second display area 202. At that time, the second information 220 for the object 30 as shown in FIG. 3 is not displayed. That is, when the input unit 302 receives a plurality of object signals, the second information 220 for the one with the higher urgency is displayed while the second information 220 for the one with the lower urgency is not displayed. As described, the first information 120 does not need to be displayed because it is only necessary to notify the driver of "detecting" and "there is a pedestrian 40" by the second information 220. At that time, only the guidance information 110 may be displayed in the first display area 102 of the first display device 100, or a displayable part 130 may be secured while the guidance information 110 is being displayed. The displayable part 130 is a part for displaying the first information 120 when the first information 120 is present.

Further, the input unit 302 of the display control device 300 in FIG. 2 may receive an object signal whose urgency information indicates warning. The object signal is received from the input unit 302, and the urgency information is extracted from the object signal. When the urgency information indicates warning, the generation unit 304 determines not to execute the synchronous display. This corresponds to displaying only the second information 220 without displaying the first information 120. When it is determined not to execute the synchronous display, the generation unit 304 generates only the second information 220 without generating the first information 120 based on the object signal. The generation unit 304 outputs the first information 120 and the information as to whether or not to execute the synchronous display to the control unit 306.

Figure 10:
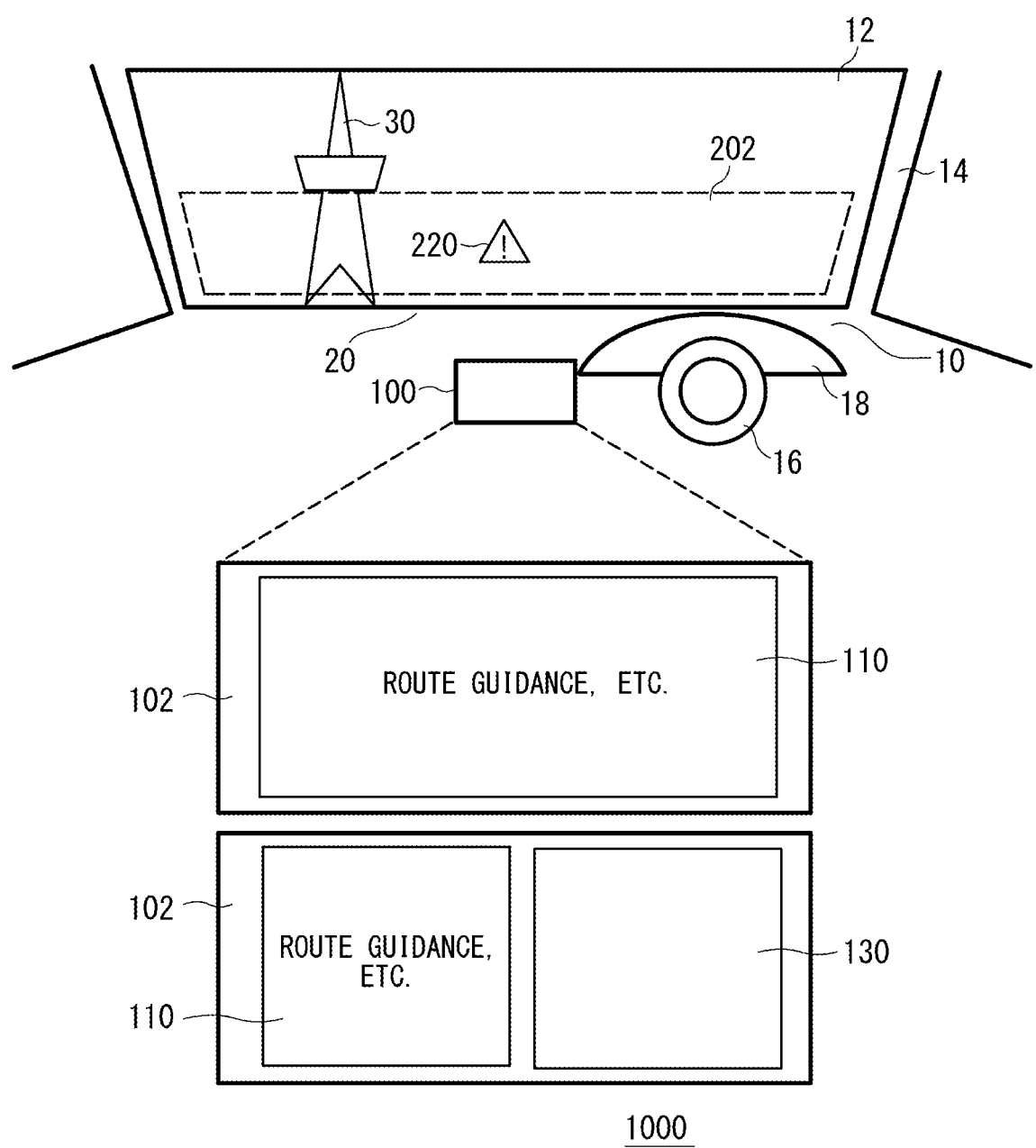
FIG. 10 is another diagram schematically showing the interior of the vehicle according to the first embodiment.

The control unit 306 displays the second information 220 generated by the generation unit 304 on the second display device 200. FIG. 10 is another diagram schematically showing the interior of the vehicle 1000. This is shown in the same way as in FIG. 1. The second information 220 is displayed in the second display area 202. On the other hand, the display in the first display area 102 is the same as that in FIG. 9. In the third embodiment, the first information 120 is not displayed on the first display device 100, and the second information 220 is displayed on the second display device 200. However, the disclosure is not limited to this example, and the first information 120 may be displayed on the first display device 100 while and the second information 220 is not displayed on the second display device 200. In this way, when information with a higher degree of urgency starts being displayed, the synchronous display does not have to be executed.

Figure 11:
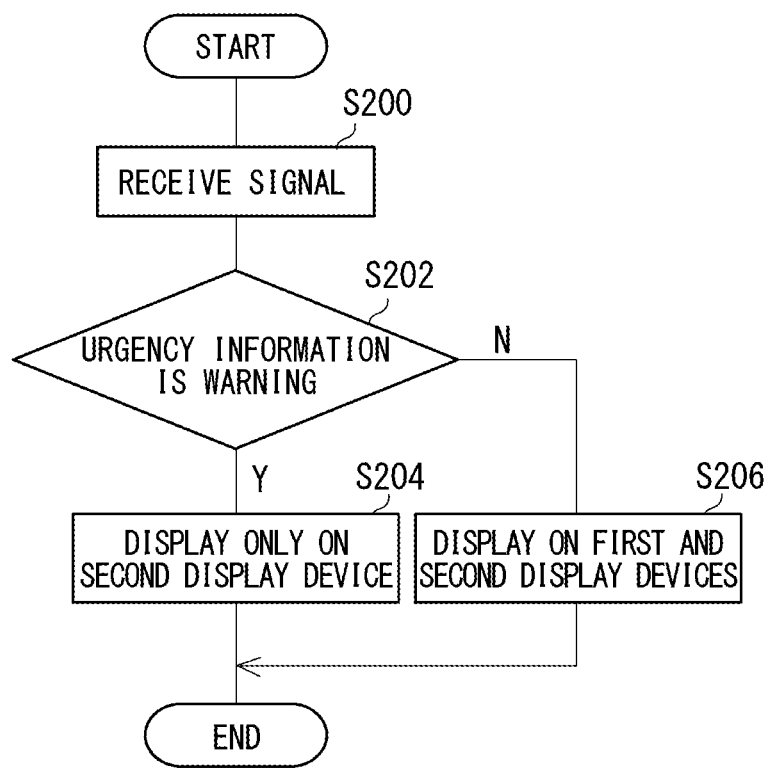
FIG. 11 is a flowchart showing a procedure of display control performed by a display control device according to the first embodiment.

The operation of the vehicle 1000 having the above-mentioned structure will now be described. FIG. 11 is a flowchart showing a procedure of display control performed by the display control device 300. The input unit 302 receives an object signal (S200). When the urgency information is warning (Y in S202), the control unit 306 executes the display only on the second display device 200 (S204). When the urgency information is not warning (N in S202), the control unit 306 executes the display on the first display device 100 and the second display device 200 (S206).

According to the present embodiment, when the pedestrian 40 is detected, since only the second information 220 surrounding the pedestrian 40 is displayed, the driver can be notified of the existence of the pedestrian 40. Furthermore, since the driver can be notified of the existence of the pedestrian 40, a collision accident can be prevented. Also, when the urgency information indicates warning, since only the second information 220 is displayed without displaying the first information 120, it is possible to prevent looking aside for a long time. Further, since looking aside for a long time can be prevented, safety can be improved.

Fourth Embodiment

The fourth exemplary embodiment will be described next. The fourth embodiment relates to a display system 500 similar to those shown thus far. Thus far, synchronous display is performed on the first information 120 in the first display device 100 and the second information 220 in the second display device 200. Depending on an occupant such as the driver, such a synchronous display may be annoying. Therefore, the fourth embodiment relates to display for reducing the annoyance. A vehicle 1000 and a display system 500 according to the fourth embodiment are of the same type as those in FIGS. 1, 3, and 2. A description will be made mainly regarding the difference from the previous explanations.

The generation unit 304 generates independent information to be displayed on one of the first display device 100 and the second display device 200. Unlike the first information 120 and the second information 220, the single information is not information that should be displayed synchronously. The control unit 306 displays the independent information on one of the first display device 100 and the second display device 200.

Under such a situation, when displaying the first information 120 on the first display device 100 and displaying the second information 220 on the second display device 200, the control unit 306 lowers the brightness of the display compared to the case where the independent information is displayed. This is because peripheral vision is sensitive to brightness. For example, when the control unit 306 displays the first information 120 on the first display device 100 and displays the second information 220 on the second display device 200, "blue" is used instead of "green" and "red". The color "green" is a color with high brightness, and the color "red" is a color that is easy to attract attention psychologically. On the other hand, when displaying independent information on one of the first display device 100 and the second display device 200, the control unit 306 is not subject to such color limitation.

Further, when displaying the first information 120 on the first display device 100 and displaying the second information 220 on the second display device 200, the control unit 306 may set the frequency of the blinking to 1 Hz or less. This is for the purpose of reducing the impression of urgency given to the driver by making it sufficiently lower than the frequency (3 Hz) at which epilepsy or the like is caused. On the other hand, when displaying independent information on one of the first display device 100 and the second display device 200, the control unit 306 is not subject to such frequency limitation. Further, when displaying the first information 120 on the first display device 100 and displaying the second information 220 on the second display device 200, the control unit 306 may set the duty ratio of the blinking to 70% or more. This is because in the case of visual stimulation, a low duty ratio draws too much attention. On the other hand, when displaying independent information on one of the first display device 100 and the second display device 200, the control unit 306 is not subject to such duty ratio limitation. That is, the control unit 306 sets the display mode of the first display area 102 and the second display area 202 and the display mode of the independent information to be different.

In order to reduce the annoyance, the following process may be further executed. The control unit 306 derives the number of displays such as the first information 120. The derivation of the number of displays corresponds to the estimation of the degree of annoyance. The larger the number of the displays, the greater the degree of annoyance at that time. Further, the control unit 306 may estimate the degree of annoyance based on the moving distance of the line of sight measured by the line-of-sight measurement device 422. The longer the moving distance, the greater the degree of annoyance at that time. The control unit 306 changes the first information 120 and the display of the first information 120 when the degree of annoyance is greater than a threshold value. For example, the blue color is displayed more strongly, the frequency of the blinking is further lowered, or the duty ratio of the blinking is further increased. This corresponds to changing at least one of the first regularity and the second regularity.

According to the present embodiment, since the display color of the first information and the second information and the display color of the independent information are different, the annoyance can be reduced. Further, since the frequency of the blinking of the first information and the second information and the frequency of the blinking of the single information are different, the annoyance can be reduced. Further, since the duty ratio of the blinking of the first information and the second information and the duty ratio of the blinking of the single information are different, the annoyance can be reduced. Further, since at least one of the first regularity and the second regularity is changed according to the degree of annoyance, the annoyance can be reduced.

Fifth Embodiment

The fifth exemplary embodiment will be explained next. The fifth embodiment relates to a display system 500 similar to those shown thus far. Thus far, notification by display has been described. In the fifth embodiment, notification by vibration, sound, and light emission is added in addition to the display. A vehicle 1000 and a display system 500 according to the fifth embodiment are of the same type as those in FIGS. 1, 3, and 2. A description will be made mainly regarding the difference from the previous explanations.

Figure 12:
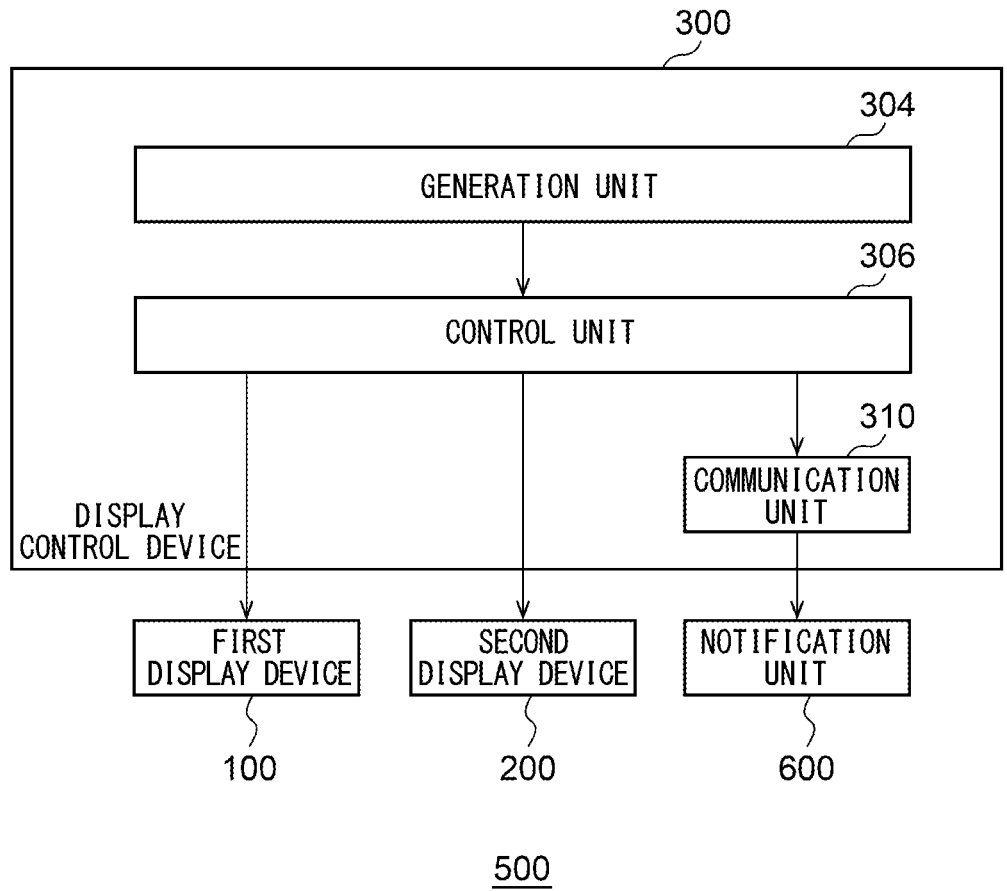
FIG. 12 is a diagram showing the configuration of a display system according to the fifth embodiment.

FIG. 12 shows the configuration of the display system 500. The display system 500 includes a display control device 300, a first display device 100, a second display device 200, and a notification device 600. The display control device 300 includes a generation unit 304, a control unit 306, and a communication unit 310. When the generation unit 304 receives an object signal from the input unit 302, the generation unit 304 generates the first information 120 and the second information 220 in the same way as before. Further, the generation unit 304 generates notification information based on the object signal. The notification information is information for giving notification of the existence of an object. The generation unit 304 outputs the first information 120, the second information 220, and the notification information to the control unit 306.

The control unit 306 displays the first information 120 on the first display device 100 and displays the second information 220 on the second display device 200 in the same way as before. At the same time, the control unit 306 transmits notification information to the communication unit 310, and the communication unit 310 transmits the notification information to the notification device 600. The notification device 600 is, for example, a driver's seat with a vibration function. When the notification device 600 receives a notification signal from the communication unit 310, the notification device 600 executes notification by vibration. The notification device 600 is not limited to a driver's seat and may be a wearable device such as a watch. Further, non-display notification in the notification device 600 is not limited to vibration and may be the outputting of a sound.

Figure 13:
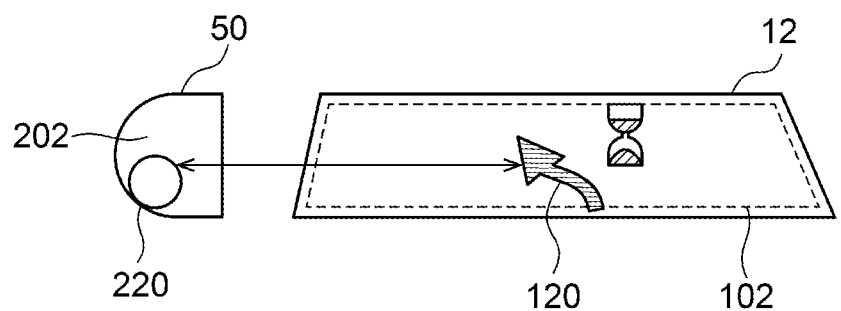
FIG. 13 is a diagram schematically showing a vehicle according to the fifth embodiment.

The notification may be made as follows. FIG. 13 schematically shows a vehicle 1000. The vehicle 1000 includes a windshield 12 and a side mirror 50. The windshield 12 corresponds to the first display device 100, and the side mirror 50 corresponds to the second display device 200. The windshield 12 is provided with a first display area 102, and the first information 120 is displayed in the first display area 102. The side mirror 50 is provided with a second display area 202, and the second information 220 is displayed in the second display area 202. The display of the second information 220 is made by the light emission of a light emitting diode (LED).

According to the present embodiment, since non-display notification is executed, the degree of freedom in the structure can be improved.

Sixth Embodiment

Subsequently, the sixth embodiment will be described. The sixth embodiment relates to a display system 500 similar to those shown thus far. It has been described that the display modes of the first information 120 and the second information 220 that correspond to each other are matched thus far. The present embodiment relates to changing the display mode of non-corresponding information. A vehicle 1000 and a display system 500 according to the sixth embodiment are of the same type as those in FIGS. 1, 3, and 2. A description will be made mainly regarding the difference from the previous explanations.

Figure 14A:
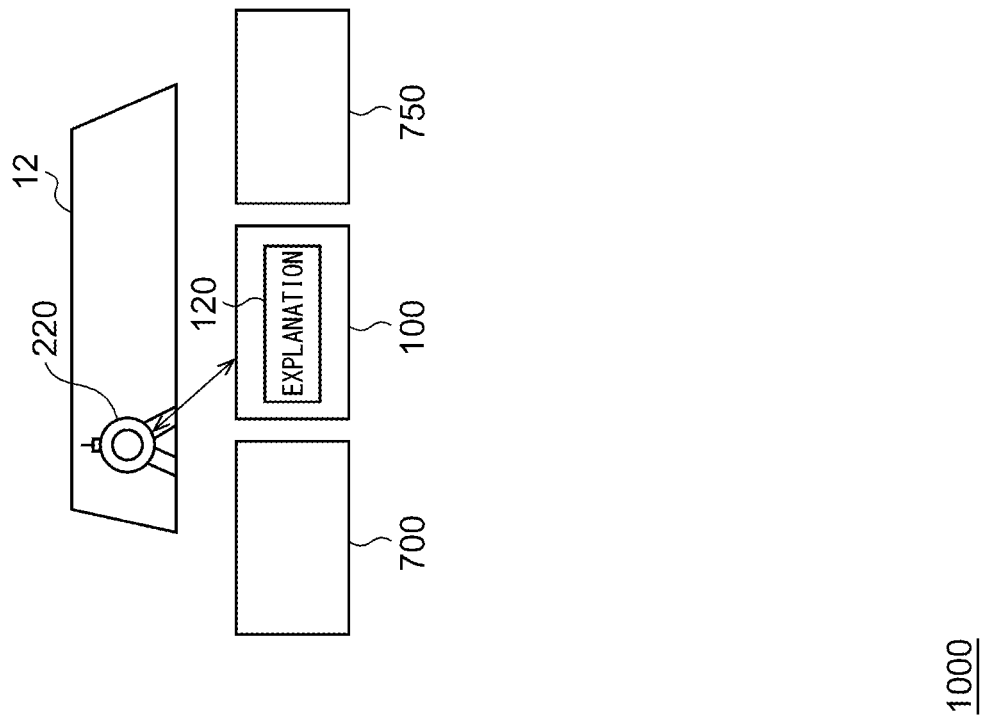
FIGS. 14A-14C are diagrams schematically showing a vehicle according to the sixth embodiment.
Figure 14B:
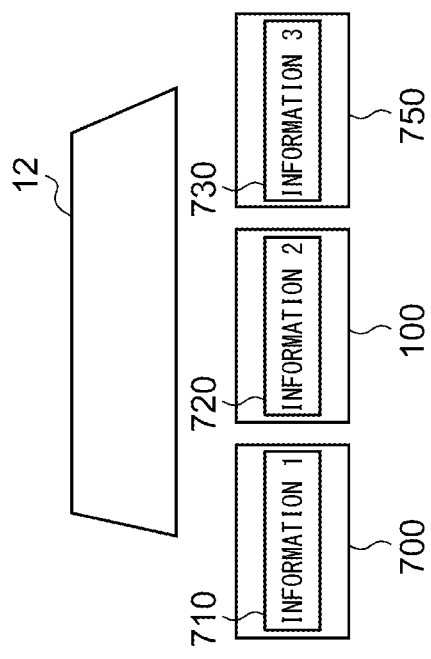
Figure 14C:
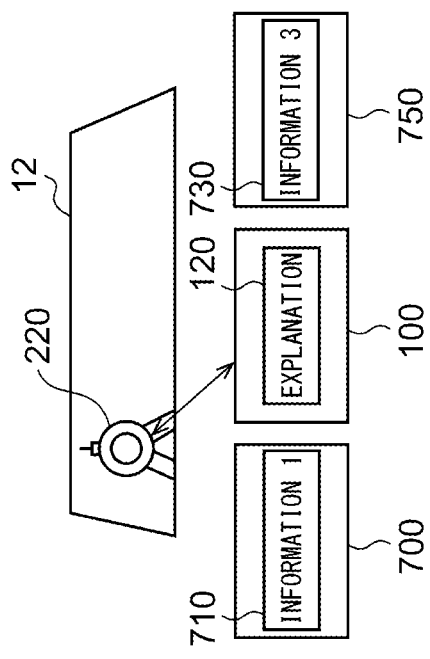

FIGS. 14A-14C schematically show the vehicle 1000. As shown in FIG. 14A, the vehicle 1000 includes a windshield 12, a first display device 100, a third display device 700, and a fourth display device 750. The first display device 100, the third display device 700, and the fourth display device 750 are arranged side by side on, for example, the center console 20 in FIG 1. The first display device 100, the third display device 700, and the fourth display device 750 may be integrally formed. The control unit 306 (not shown) displays first predetermined information 710 on the third display device 700, displays second predetermined information 720 on the first display device 100, and displays third predetermined information 730 on the fourth display device 750. The first predetermined information 710, the second predetermined information 720, and the third predetermined information 730 are information that do not correspond to one another.

FIG. 14B shows a case where the generation unit 304 has generated the first information 120 and the second information 220 in the state shown in FIG. 14A. The control unit 306 displays the first information 120 on the first display device 100, and displays the second information 220 on the windshield 12. Further, the control unit 306 does not display the first predetermined information 710 on the third display device 700 and does not display the third predetermined information 730 on the fourth display device 750. At that time, synchronous display does not need to be performed on the first information 120 and the second information 220.

FIG. 14C shows a case where the generation unit 304 has generated the first information 120 and the second information 220 in the state shown in FIG. 14A. The control unit 306 displays the first information 120 on the first display device 100, and displays the second information 220 on the windshield 12. Further, the control unit 306 displays the first predetermined information 710 on the third display device 700 and displays the third predetermined information 730 on the fourth display device 750. At that time, the point of time of the display may be off from the point of time at which the synchronous display is performed on the first information 120 and the second information 220.

According to the present exemplary variation, when the first information is displayed on the first display device and the second information is displayed on the second display device, since predetermined information is not displayed on the third display device, notification of the relevance between the first information and the second information can be given. Further, since predetermined information displayed on the third display device is not blinked when displaying the first information on the first display device and displaying the second information on the second display device, notification of the relevance between the first information and the second information can be given even when the point of time at which the synchronous display for the first information and the second information is off.

As described above, the embodiments according to the present disclosure have been described in detail with reference to the drawings. However, the functions of the above-mentioned devices and each processing unit can be realized by a computer program. A computer that realizes the above-mentioned functions by a program includes input devices such as keyboards, mouse devices, and touch pads, output devices such as displays and speakers, central processing units (CPUs), storage devices such as ROMs, RAMS, hard disk devices, and solid state drives (SSDs), a reading device for reading information from recording media such as digital versatile disk read only memory (DVD-ROMs) and USB memory, and a network card for performing communication via a network, and the like, and the units are connected by a bus.

Further, from a recording medium in which the program is recorded, the reading device reads the program and stores the program in a storage device. Alternatively, the network card communicates with a server device connected to the network and stores the program downloaded from the server device for realizing the functions of the devices in the storage device. Further, the functions of the devices are realized by the CPU copying the program stored in the storage device to the RAM, sequentially reading instructions included in the program from the RAM, and executing the program.

The outline of one aspect of the present disclosure is as follows. A display control device according to one aspect of the present disclosure includes: an input unit that receives a signal relating to an object; a generation unit that generates first information and second information relating to the object based on the signal received by the input unit; and a control unit that displays the first information generated by the generation unit on a first display device and displays the second information generated by the generation unit on a second display device. The amount of information of the second information generated by the generation unit is equal to or less than the amount of information of the first information, and the control unit changes the display mode of the first information with the passage of time according to the first regularity and the display mode of the second information with the passage of time according to the second regularity corresponding to the first regularity.

According to this aspect, since the first regularity of the first information 120 and the second regularity of the second information 220 are made to correspond to each other, notification of the relevance between the first information 120 and the second information 220 can be given while suppressing the movement of the line of sight.

The display control device may be provided in a moving body, the first regularity may be a first regularity relating to a change in light emission, and the second regularity may be a second regularity relating to a change in light emission. In this case, since the changes in light emission are made to correspond to each other, notification of the relevance between the first information and the second information can be given.

The display control device may be attached to a moving body, the first regularity may be the first regularity relating to the change in light emission, and the second regularity may be the second regularity relating to the change in light emission. In this case, since the changes in light emission are made to correspond to each other, notification of the relevance between the first information and the second information can be given.

The first regularity is a first regularity relating to blinking, and the second regularity is a second regularity relating to blinking. In this case, since the changes in blinking are made to correspond to each other, notification of the relevance between the first information and the second information can be given.

The first regularity is a first regularity relating to blinking, and the second regularity is a second regularity relating to blinking. In this case, since the changes in blinking are made to correspond to each other, notification of the relevance between the first information and the second information can be given.

The display control device may be provided in a moving body, the first regularity may be a first regularity relating to temporal change of the enlargement amount or the reduction amount of the display size, and the second regularity may be a second regularity relating to temporal change of the enlargement amount or the reduction amount of the display size. In this case, since the changes in the enlargement amount or the reduction amount of the display size are made to correspond to each other, notification of the relevance between the first information and the second information can be given.

The display control device may be attached to a moving body, the first regularity may be a first regularity relating to the temporal change of the enlargement amount or the reduction amount of the display size, and the second regularity may be a second regularity relating to the temporal change of the enlargement amount or the reduction amount of the display size. In this case, since the changes in the enlargement amount or the reduction amount of the display size are made to correspond to each other, notification of the relevance between the first information and the second information can be given.

The control unit may set the difference between a point of time when a change in the display mode of the first information based on the first regularity starts and a point of time when a change in the display mode of the second information based on the second regularity starts to be within a predetermined threshold value and set either one of the cycle of the change based on the first regularity and the cycle of the change based on the second regularity to be a predetermined integer multiple of the other one of the cycle of the change based on the first regularity and the cycle of the change based on the second regularity. In this case, since the difference between the point of time when the change based on the first regularity starts and the point of time when the change based on the second regularity starts is set to be within the predetermined threshold value, notification of the relevance between the first information and the second information can be given.

The control unit may set the difference between the point of time when the change in the display mode of the first information based on the first regularity starts and the point of time when the change in the display mode of the second information based on the second regularity starts being displayed to be larger than the predetermined threshold value and set either one of the cycle of the change based on the first regularity and the cycle of the change based on the second regularity to be a predetermined integer multiple of the other one of the cycle of the change based on the first regularity and the cycle of the change based on the second regularity. In this case, since the difference between the point of time when the change based on the first regularity starts and the point of time when the change based on the second regularity starts is set to be larger than the predetermined threshold value, it is possible to execute the display that matches the action of looking at one and then looking at the other.

The control unit may set the difference between a point of time when a change in the display mode of the first information based on the first regularity ends and a point of time when a change in the display mode of the second information based on the second regularity ends to be within a predetermined threshold value and set either one of the cycle of the change based on the first regularity and the cycle of the change based on the second regularity to be a predetermined integer multiple of the other one of the cycle of the change based on the first regularity and the cycle of the change based on the second regularity.

The control unit may set the difference between the point of time when the change in the display mode of the first information based on the first regularity ends and the point of time when the change in the display mode of the second information based on the second regularity ends to be larger than the predetermined threshold value and set either one of the cycle of the change based on the first regularity and the cycle of the change based on the second regularity to be a predetermined integer multiple of the other one of the cycle of the change based on the first regularity and the cycle of the change based on the second regularity.

Upon detecting the paying attention to the first information paid by the user, the control unit may set the difference between the point of time when the change in the display mode of the first information based on the first regularity ends and the point of time when change in the display mode of the second information based on the second regularity ends to be within a predetermined threshold value. In this case, when a certain period of time has passed, the control unit ends the matching of the point of time for the change in the first regularity with the point of time for the change in the second regularity, and the annoyance due to synchronous display can therefore be suppressed from occurring.

Upon receiving ending input, the control unit may end setting the difference between the point of time when the change in the display mode of the first information based on the first regularity ends and the point of time when change in the display mode of the second information based on the second regularity ends to be within a predetermined threshold value. In this case, when receiving ending input, the control unit ends the matching of the point of time for the change in the first regularity with the point of time for the change in the second regularity, and the annoyance due to synchronous display can therefore be suppressed from occurring.

The signal received by the input unit is a first signal relating to a first object, the generation unit generates first information and second information relating to the first object based on the first signal received by the input unit, the input unit also receives a second signal relating to a second object, the generation unit generates third information and fourth information relating to the second object based on the second signal received by the input unit, the control unit displays the third information generated by the generation unit on the first display device and displays the fourth information generated by the generation unit on the second display device, the amount of information of the fourth information generated by the generation unit is equal to or less than the amount of information of the third information, the control unit changes the display mode of the third information with the passage of time according to the third regularity and changes the display mode of the fourth information with the passage of time according to the fourth regularity, and the third regularity and the fourth regularity in the control unit correspond to each other, the first regularity and the third regularity in the control unit do not correspond to each other, and the second regularity and the fourth regularity in the control unit do not correspond to each other. In this case, since the first regularity and the third regularity are not made to correspond to each other and the second regularity and the fourth regularity are not made to correspond to each other, the first object 30 and the second object 30 can be distinguished from each other.

The generation unit may generate independent information to be displayed on one of the first display device and the second display device, the control unit may display the independent information generated by the generation unit on one of the first display device and the second display device, and the control unit may set the display mode of the first information and the second information and the display mode of the independent information to be different. In this case, since the display mode of the first information and the second information and the display mode of the single information are different, the annoyance can be reduced.

The control unit may estimate the degree of annoyance of the user and may change at least one of the first regularity and the second regularity according to the estimated degree of annoyance. In this case, since at least one of the first regularity and the second regularity is changed according to the degree of annoyance, the annoyance can be reduced.

The generation unit may generate notification information relating to the object based on the signal received by the input unit, and the control unit may cause a notification device to execute non-display notification based on the notification information relating to the object. In this case, since non-display notification is executed, the degree of freedom in the structure can be improved.

When a predetermined condition is satisfied while displaying the same predetermined information on each of the first display device, the second display device, and the third display device, the control unit may set the display mode of the predetermined information displayed on the third display device to be different from the display mode of the predetermined information displayed on each of the first display device and the second display device or may end the display of the predetermined information performed by the third display device. In this case, when the first information is displayed on the first display device and the second information is displayed on the second display device, since the predetermined information is not displayed on the third display device, notification of the relevance between the first information and the second information can be given.

The first display device and the second display device may be mounted on a vehicle. In this case, information for supporting driving can be displayed by three display units.

The first display device and the second display device may be arranged on the front side of the driver's seat in the vehicle. In this case, since the first display device and the second display device are arranged on the front side of the driver's seat in the vehicle, information for supporting driving can be displayed. Another aspect of the present disclosure relates to a display system. This display system includes a first display device, a second display device, and a display control device that controls display on the first display device and the second display device. The display control device includes: an input unit that receives a signal relating to an object; a generation unit that generates first information and second information relating to the object based on the signal received by the input unit; and a control unit that displays the first information generated by the generation unit on a first display device and displays the second information generated by the generation unit on a second display device. The amount of information of the second information generated by the generation unit is equal to or less than the amount of information of the first information, and the control unit changes the display mode of the first information with the passage of time according to the first regularity and the display mode of the second information with the passage of time according to the second regularity corresponding to the first regularity.

According to this aspect, since the first regularity of the first information 120 and the second regularity of the second information 220 are made to correspond to each other, notification of the relevance between the first information and the second information can be given while suppressing the movement of the line of sight.

Still another aspect of the present disclosure relates to a display control method. This method includes: receiving a signal relating to an object; generating first information and second information relating to the object based on the received signal; and displaying the first information that has been generated on a first display device and displaying the second information that has been generated on a second display device. The amount of information of the second information generated in the generating is equal to or less than the amount of information of the first information, and in the displaying, the display mode of the first information is changed with the passage of time according to the first regularity and the display mode of the second information is changed with the passage of time according to the second regularity corresponding to the first regularity.

Described above is an explanation on the present disclosure based on the embodiments. These embodiments are intended to be illustrative only, and it will be obvious to those skilled in the art that various modifications to constituting elements and processes could be developed and that such modifications are also within the scope of the present disclosure.

In the first through sixth embodiments, a display system 500 is mounted on a vehicle 1000. However, without limiting thereto, for example, the display system 500 may be mounted on a moving body such as a bicycle, a motorcycle, a train, a ship, an aircraft, agricultural equipment, or other industrial equipment. Further, the moving body may include a person, and in that case, the display system 500 may be attached to the moving body. When the moving body is a person, the display system 500 corresponds to eyewear. The eyewear is, for example, augmented reality (AR) glasses and virtual reality (VR) glasses. According to this variation, the scope of application of the embodiment is expanded.

In the first through sixth embodiments, the blinking or the size of the first information 120 and the second information 220 changes. However, without limiting thereto, for example, the light emission of the first information 120 and the second information 220 may change. More specifically, the color of emitted light, the brightness of the light, the blinking, and two or more types of these may change. Further, the "change" may be a continuous change such as gradation, or a discrete change such as ON/OFF switching. According to the present variation, the degree of freedom in the structure can be improved.

In the first through sixth embodiments, either one of the cycle of the change based on the first regularity and the cycle of the change based on the second regularity is set to be a predetermined integer multiple of the other one. However, this is not limited to an integer multiple and may be an arbitrary fractional multiple such as 3/2 or an arbitrary decimal multiple such as 0.5.

Further, in the first to sixth embodiments, the capability of giving notification of the relevance between the first information 120 and the second information 220 while suppressing the movement of the line of sight allows for the recognition of the existence of the first information 120 related to the second information 220, thereby allowing the first information 120 to be quickly learned when the first information 120 is necessary and allowing the first information 120 to be ignored when the first information 120 is not necessary. Therefore, it is possible to convey only the necessary information to the user while displaying a lot of information on a plurality of display devices.

INDUSTRIAL APPLICABILITY

According to the present disclosure, notification of the relevance of information displayed on a plurality of display devices can be given while suppressing the movement of the line of sight.

REFERENCE SIGNS LIST 10 dashboard,
12 windshield,
14 pillar,
16 steering wheel,
18 meter,
20 center console,
30 object,
40 pedestrian,
100 first display device,
102 first display area,
110 guidance information,
120 first information,
130 displayable part,
200 second display device,
202 second display area,
220 second information,
300 display control device,
302 input unit,
304 generation unit,
306 control unit,
400 positioning device,
402 storage device,
404 image-capturing device,
420 brightness measurement device,
422 line-of-sight measurement device,
424 operation device,
500 display system,
1000 vehicle

The invention claimed is:

1. A display control device comprising:
a processor; and
a memory coupled to the processor, the memory storing a program that, when executed by the processor, causes the display control device to:
receive a signal relating to an object;
generate first information and second information relating to the object based on the received signal;
display the first information on a first display device and display the second information on a second display device, an amount of information of the second information being equal to or less than an amount of information of the first information;
change a display mode of the first information with the passage of time according to a first regularity and a display mode of the second information with the passage of time according to a second regularity corresponding to the first regularity;
set a difference between a point of time when a change in the display mode of the first information based on the first regularity starts and a point of time when a change in the display mode of the second information based on the second regularity starts to be within a predetermined threshold value; and
set either one of a cycle of the change based on the first regularity and a cycle of the change based on the second regularity to be a predetermined integer multiple of the other one of the cycle of the change based on the first regularity and the cycle of the change based on the second regularity.

2. The display control device according to claim 1, wherein
the display control device is provided in a moving body or attached to a moving body,
the first regularity is a first regularity relating to change in light emission, and
the second regularity is a second regularity relating to change in light emission.

3. The display control device according to claim 1, wherein
the first regularity is a first regularity relating to blinking, and
the second regularity is a second regularity relating to blinking.

4. The display control device according to claim 1, wherein
the display control device is provided in a moving body or attached to a moving body,
the first regularity is a first regularity relating to temporal change of an enlargement amount or a reduction amount of a display size, and
the second regularity is a second regularity relating to temporal change of the enlargement amount or the reduction amount of the display size.

5. The display control device according to claim 1, wherein the program, when executed by the processor, causes the display control device to:
upon receiving ending input, end setting the difference between the point of time when the change in the display mode of the first information based on the first regularity ends and the point of time when the change in the display mode of the second information based on the second regularity ends to be within the predetermined threshold value.

6. The display control device according to claim 1, wherein the program, when executed by the processor, causes the display control device to:
generate independent information to be displayed on one of the first display device and the second display device,
display the independent information on one of the first display device and the second display device, and
set the display mode of the first information and the second information and the display mode of the independent information to be different.

7. The display control device according to claim 1, wherein the program, when executed by the processor, causes the display control device to:
generate notification information relating to the object based on the received signal; and
cause a notification device to execute non-display notification based on the notification information relating to the object.

8. The display control device according to claim 1, wherein the first display device and the second display device are mounted on a vehicle.

9. The display control device according to claim 8, wherein the first display device and the second display device are arranged on a front side of a driver's seat in the vehicle.

10. A display control device, comprising:
a processor; and
a memory coupled to the processor, the memory storing a program that, when executed by the processor, causes the display control device to:

receive a signal relating to an object;
generate first information and second information relating to the object based on the received signal;
display the first information on a first display device and display the second information on a second display device, an amount of information of the second information being equal to or less than an amount of information of the first information;
change a display mode of the first information with the passage of time according to a first regularity and a display mode of the second information with the passage of time according to a second regularity corresponding to the first regularity;
set a difference between a point of time when a change in the display mode of the first information based on the first regularity starts and a point of time when a change in the display mode of the second information based on the second regularity starts to be larger than a predetermined threshold value; and
set a cycle of the change based on the first regularity and a cycle of the change based on the second regularity to be a predetermined integer multiple of the other one of the cycle of the change based on the first regularity and the cycle of the change based on the second regularity.

11. A display control device, comprising:
a processor; and
a memory coupled to the processor, the memory storing a program that, when executed by the processor, causes the display control device to:
receive a signal relating to an object;
generate first information and second information relating to the object based on the received signal;
display the first information on a first display device and display the second information on a second display device, an amount of information of the second information being equal to or less than an amount of information of the first information;
change a display mode of the first information with the passage of time according to a first regularity and a display mode of the second information with the passage of time according to a second regularity corresponding to the first regularity;
set a difference between a point of time when a change in the display mode of the first information based on the first regularity ends and a point of time when a change in the display mode of the second information based on the second regularity ends to be within a predetermined threshold value; and
set either one of a cycle of the change based on the first regularity and a cycle of the change based on the second regularity to be a predetermined integer multiple of the other one of the cycle of the change based on the first regularity and the cycle of the change based on the second regularity.

12. A display control device, comprising:
a processor; and
a memory coupled to the processor, the memory storing a program that, when executed by the processor, causes the display control device to:
receive a signal relating to an object;
generate first information and second information relating to the object based on the received signal;
display the first information on a first display device and display the second information on a second display device, an amount of information of the second information being equal to or less than an amount of information of the first information;
change a display mode of the first information with the passage of time according to a first regularity and a display mode of the second information with the passage of time according to a second regularity corresponding to the first regularity;
set a difference between a point of time when a change in the display mode of the first information based on the first regularity ends and a point of time when a change in the display mode of the second information based on the second regularity ends to larger than a predetermined threshold value; and
set either one of a cycle of the change based on the first regularity and a cycle of the change based on the second regularity to be a predetermined integer multiple of the other one of the cycle of the change based on the first regularity and the cycle of the change based on the second regularity.

13. A display control device, comprising:
a processor; and
a memory coupled to the processor, the memory storing a program that, when executed by the processor, causes the display control device to:
receive a signal relating to an object;
generate first information and second information relating to the object based on the received signal;
display the first information on a first display device and display the second information on a second display device, an amount of information of the second information being equal to or less than an amount of information of the first information;
change a display mode of the first information with the passage of time according to a first regularity and a display mode of the second information with the passage of time according to a second regularity corresponding to the first regularity; and
upon detecting that an attention to the first information is paid by a user, set a difference between the point of time when a change in the display mode of the first information based on the first regularity ends and the point of time when a change in the display mode of the second information based on the second regularity ends to be within a predetermined threshold value.

14. A display control device, comprising:
a processor; and
a memory coupled to the processor, the memory storing a program that, when executed by the processor, causes the display control device to:
receive a signal relating to a first object;
generate first information and second information relating to the first object based on the received signal;
display the first information on a first display device and display the second information on a second display device, an amount of information of the second information being equal to or less than an amount of information of the first information;
change a display mode of the first information with the passage of time according to a first regularity and a display mode of the second information with the passage of time according to a second regularity corresponding to the first regularity;
receive a second signal relating to a second object,
generate third information and fourth information relating to the second object based on the received second signal;

display the third information on the first display device and display the fourth information on the second display device, wherein an amount of information of the fourth information is equal to or less than an amount of information of the third information; and change a display mode of the third information with the passage of time according to a third regularity and change a display mode of the fourth information with the passage of time according to a fourth regularity, wherein:

the third regularity and the fourth regularity correspond to each other, the first regularity and the third regularity do not correspond to each other, and the second regularity and the fourth regularity do not correspond to each other.

15. A display control device, comprising:

a processor; and a memory coupled to the processor, the memory storing a program that, when executed by the processor, causes the display control device to:

receive a signal relating to an object;

generate first information and second information relating to the object based on the received signal;

display the first information on a first display device and display the second information on a second display device, an amount of information of the second information being equal to or less than an amount of information of the first information;

change a display mode of the first information with the passage of time according to a first regularity and a display mode of the second information with the passage of time according to a second regularity corresponding to the first regularity;

estimate a degree of annoyance of a user; and change at least one of the first regularity and the second regularity according to the estimated degree of annoyance.

16. A display control device, comprising:

a processor; and a memory coupled to the processor, the memory storing a program that, when executed by the processor, causes the display control device to:

receive a signal relating to an object;

generate first information and second information relating to the object based on the received signal;

display the first information on a first display device and display the second information on a second display device, an amount of information of the second information being equal to or less than an amount of information of the first information;

change a display mode of the first information with the passage of time according to a first regularity and a display mode of the second information with the passage of time according to a second regularity corresponding to the first regularity; and when a predetermined condition is satisfied while displaying the same predetermined information on each of the first display device, the second display device, and a third display device, set a display mode of the predetermined information displayed on the third display device to be different from a display mode of the predetermined information displayed on each of the first display device and the second display device or end the display of the predetermined information performed by the third display device.

17. A display system comprising:

a first display device;

a second display device; and a display control device that controls display on the first display device and the second display device, wherein the display control device includes:

a processor; and a memory coupled to the processor, the memory storing a program that, when executed by the processor, causes the display control device to:

receive a signal relating to an object;

generate first information and second information relating to the object based on the received signal;

display the first information on the first display device and display the second information on the second display device, wherein an amount of information of the second information is equal to or less than an amount of information of the first information;

change a display mode of the first information with the passage of time according to a first regularity and a display mode of the second information with the passage of time according to a second regularity corresponding to the first regularity;

set a difference between a point of time when a change in the display mode of the first information based on the first regularity starts and a point of time when a change in the display mode of the second information based on the second regularity starts to be within a predetermined threshold value; and set either one of a cycle of the change based on the first regularity and a cycle of the change based on the second regularity to be a predetermined integer multiple of the other one of the cycle of the change based on the first regularity and the cycle of the change based on the second regularity.

18. A display control method comprising:

receiving a signal relating to an object;

generating first information and second information relating to the object based on the received signal;

displaying the first information that has been generated on a first display device and displaying the second information that has been generated on a second display device, wherein an amount of information of the second information generated in the generating is equal to or less than an amount of information of the first information, and in the displaying, a display mode of the first information is changed with the passage of time according to a first regularity and a display mode of the second information is changed with the passage of time according to a second regularity corresponding to the first regularity;

setting a difference between a point of time when a change in the display mode of the first information based on the first regularity starts and a point of time when a change in the display mode of the second information based on the second regularity starts to be within a predetermined threshold value; and setting either one of a cycle of the change based on the first regularity and a cycle of the change based on the second regularity to be a predetermined integer multiple of the other one of the cycle of the change based on the first regularity and the cycle of the change based on the second regularity.

19. A display control method, comprising:
receiving a signal relating to an object;
generating first information and second information relating to the object based on the received signal;
displaying the first information on a first display device and displaying the second information on a second display device, an amount of information of the second information being equal to or less than an amount of information of the first information;
changing a display mode of the first information with the passage of time according to a first regularity and a display mode of the second information with the passage of time according to a second regularity corresponding to the first regularity;
setting a difference between a point of time when a change in the display mode of the first information based on the first regularity starts and a point of time when a change in the display mode of the second information based on the second regularity starts to be larger than a predetermined threshold value; and
setting a cycle of the change based on the first regularity and a cycle of the change based on the second regularity to be a predetermined integer multiple of the other one of the cycle of the change based on the first regularity and the cycle of the change based on the second regularity.

20. A display control method, comprising:
receiving a signal relating to an object;
generating first information and second information relating to the object based on the received signal;
displaying the first information on a first display device and displaying the second information on a second display device, an amount of information of the second information being equal to or less than an amount of information of the first information;
changing a display mode of the first information with the passage of time according to a first regularity and a display mode of the second information with the passage of time according to a second regularity corresponding to the first regularity;
setting a difference between a point of time when a change in the display mode of the first information based on the first regularity ends and a point of time when a change in the display mode of the second information based on the second regularity ends to be within a predetermined threshold value; and
setting either one of a cycle of the change based on the first regularity and a cycle of the change based on the second regularity to be a predetermined integer multiple of the other one of the cycle of the change based on the first regularity and the cycle of the change based on the second regularity.

21. A display control method, comprising:
receiving a signal relating to an object;
generating first information and second information relating to the object based on the received signal;
displaying the first information on a first display device and displaying the second information on a second display device, an amount of information of the second information being equal to or less than an amount of information of the first information;
changing a display mode of the first information with the passage of time according to a first regularity and a display mode of the second information with the passage of time according to a second regularity corresponding to the first regularity;
setting a difference between a point of time when a change in the display mode of the first information based on the first regularity ends and a point of time when a change in the display mode of the second information based on the second regularity ends to larger than a predetermined threshold value; and
setting either one of a cycle of the change based on the first regularity and a cycle of the change based on the second regularity to be a predetermined integer multiple of the other one of the cycle of the change based on the first regularity and the cycle of the change based on the second regularity.

22. A display control method, comprising:
receiving a signal relating to an object;
generating first information and second information relating to the object based on the received signal;
displaying the first information on a first display device and displaying the second information on a second display device, an amount of information of the second information being equal to or less than an amount of information of the first information; and
changing a display mode of the first information with the passage of time according to a first regularity and a display mode of the second information with the passage of time according to a second regularity corresponding to the first regularity; and
upon detecting that an attention to the first information is paid by a user, setting a difference between the point of time when a change in the display mode of the first information based on the first regularity ends and the point of time when a change in the display mode of the second information based on the second regularity ends to be within a predetermined threshold value.

23. A display control method, comprising:
receiving a signal relating to a first object;
generating first information and second information relating to the first object based on the received signal;
displaying the first information on a first display device and displaying the second information on a second display device, an amount of information of the second information being equal to or less than an amount of information of the first information;
changing a display mode of the first information with the passage of time according to a first regularity and a display mode of the second information with the passage of time according to a second regularity corresponding to the first regularity;
receiving a second signal relating to a second object,
generating third information and fourth information relating to the second object based on the received second signal;
displaying the third information on the first display device and displaying the fourth information on the second display device, wherein an amount of information of the fourth information is equal to or less than an amount of information of the third information; and
changing a display mode of the third information with the passage of time according to a third regularity and changing a display mode of the fourth information with the passage of time according to a fourth regularity, wherein:
the third regularity and the fourth regularity correspond to each other,
the first regularity and the third regularity do not correspond to each other, and
the second regularity and the fourth regularity do not correspond to each other.

24. A display control method, comprising:
receiving a signal relating to an object;
generating first information and second information relating to the object based on the received signal;
displaying the first information on a first display device and displaying the second information on a second display device, an amount of information of the second information being equal to or less than an amount of information of the first information;
changing a display mode of the first information with the passage of time according to a first regularity and a display mode of the second information with the passage of time according to a second regularity corresponding to the first regularity;
estimating a degree of annoyance of a user; and
changing at least one of the first regularity and the second regularity according to the estimated degree of annoyance.

25. A display control method, comprising:
receiving a signal relating to an object;
generating first information and second information relating to the object based on the received signal;
displaying the first information on a first display device and displaying the second information on a second display device, an amount of information of the second information being equal to or less than an amount of information of the first information;
changing a display mode of the first information with the passage of time according to a first regularity and a display mode of the second information with the passage of time according to a second regularity corresponding to the first regularity; and
when a predetermined condition is satisfied while displaying the same predetermined information on each of the first display device, the second display device, and a third display device, setting a display mode of the predetermined information displayed on the third display device to be different from a display mode of the predetermined information displayed on each of the first display device and the second display device or ending the display of the predetermined information performed by the third display device.

* * * * *